United States Patent
Okaue et al.

(10) Patent No.: US 6,820,203 B1
(45) Date of Patent: Nov. 16, 2004

(54) SECURITY UNIT FOR USE IN MEMORY CARD

(75) Inventors: Takumi Okaue, Kanagawa (JP); Yoshihito Ishibashi, Tokyo (JP); Yukihiro Sakamoto, Kanagawa (JP); Asami Mizuno, Kanagawa (JP); Nobuyuki Kihara, Tokyo (JP); Teppei Yokota, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/544,072

(22) Filed: Apr. 6, 2000

(30) Foreign Application Priority Data

Apr. 7, 1999  (JP) ............................................ 11-099947
Jun. 24, 1999  (JP) ............................................ 11-178188

(51) Int. Cl.⁷ ................................................. G06F 11/30
(52) U.S. Cl. ........................ 713/193; 713/189; 713/167; 713/200
(58) Field of Search ................................ 713/200, 193, 713/167, 189; 711/163, 152

(56) References Cited

U.S. PATENT DOCUMENTS

| | | | | |
|---|---|---|---|---|
| 4,712,177 A | * | 12/1987 | Schrenk | 235/380 |
| 5,382,839 A | * | 1/1995 | Shinohara | 327/545 |
| 5,671,367 A | * | 9/1997 | Le Roux | 710/301 |
| 5,875,480 A | * | 2/1999 | Le Roux et al. | 711/164 |
| 6,594,746 B2 | * | 7/2003 | Rabeler | 711/163 |
| 6,754,794 B2 | * | 6/2004 | Rabeler | 711/163 |
| 2003/0196054 A1 | * | 10/2003 | Rabeler | 711/163 |

* cited by examiner

*Primary Examiner*—Norman M. Wright
(74) *Attorney, Agent, or Firm*—Frommer Lawrence & Haug LLP; William S. Frommer

(57) ABSTRACT

A security unit to prevent unauthorized retrieval of data includes an encrypting unit for encrypting data in accordance with commands received by the security unit, and a common register for storing both intermediate results and final results of the data encryption. A switching element operatively coupled to the register selectively outputs the contents of the register. The switching element is controlled to prevent external access to the intermediate results of the encryption. The security unit is particularly useful as part of a memory unit that is attachable to a recording/reproduction device such as a digital audio recorder/player.

18 Claims, 19 Drawing Sheets

FILE SYSTEM PROCESSING
HIERARCHY

Fig. 7

| | | NUMBER OF BYTES | |
|---|---|---|---|
| MS CLASS | (*1) | 1 | 1 : TYPE-1 OTHER RESERVED |
| CARD TYPE | (*1) | 1 | 1 : READ ONLY 2: READ WRITE 3 : HYBRID OTHER RESERVED |
| BLOCK SIZE | (*1) | 2 | BLOCK SIZE IN KB 16KB : 0x0010 8KB : 0x0008 |
| NUMBER OF BLOCKS | (*1) | 2 | NUMBER OF BLOCKS |
| TOTAL NUMBER OF BLOCKS | (*1) | 2 | TOTAL NUMBER OF BLOCKS |
| PAGE SIZE | | 2 | PAGE SIZE, 512 FIXED, 0x0200 |
| SIZE OF REDUNDANT PORTION | | 1 | SIZE OF REDUNDANT PORTION =16 BYTES : 0x10 |
| SECURITY TYPE | (*1) | 1 | |
| DATE AND TIME OF ASSEMBLY | (*2) | 8 | DATE OF PRODUCTION OF CARD (HARD) (SEE DATE AND TIME DESIGNATION FORMAT ON NEXT PAGE.) |
| MAKER AREA | (*2) | 4 | USED FOR MANAGEMENT IN MAKER SUCH AS SERIAL NUMBER |
| MS ASSEMBLY MAKER CODE | (*2) | 1 | REGISTERED ASSEMBLY MAKER CODE |
| MS ASSEMBLY TYPE CODE | (*2) | 3 | REGISTERED ASSEMBLY TYPE CODE |
| MEMORY MAKER CODE | | 2 | CHIP MAKER CODE 0 : UNKNOWN |
| MEMORY DEVICE CODE | | 2 | DEVICE CODE 0 : UNKNOWN |
| MEMORY SIZE | | 2 | MB ex : 32 MBITS FLASH 0x0004 |
| FORMAT RESERVE | | 1 | 1 : OTHER RESERVED |
| FORMAT RESERVE | | 1 | 1 : OTHER RESERVED |
| VCC | | 1 | VCC UNIT : 0.1 V ex ) 3.3 V 0x21 |
| VPP | | 1 | VPP UNIT : 0.1 V ex ) 3.3 V 0x21 |
| CONTROLLER NUMBER | | 2 | CONTROLLER CHIP NUMBER |
| RESERVE | | 14 | |
| FORMAT TYPE | (*1) | 1 | 1 : FAT OTHER RESERVED |
| APPLICATION | | 1 | 0 : GENERAL PURPOSE OTHER RESERVED |
| ZERO RESET RESERVE | | 5 | |
| RESERVE | | 35 | |

CONTENTS IN RECORDER

CONTENTS IN MEMORY CARD

Fig. 16

| TPC | | DEFINITION | DEFINITION | R/W | DATA LENGTH |
|---|---|---|---|---|---|
| 2Dh | 0010 1101 | READ_PAGE_DATA | → | R | 512B+2B(CRC) |
| D2h | 1101 0010 | WRITE_PAGE_DATA | → | W | 512B+2B(CRC) |
| 4Bh | 0100 1011 | READ_REG | → | R | 31B+2B(CRC) |
| B4h | 1011 0100 | WRITE_REG | → | W | 15B+2B(CRC) |
| 78h | 0111 1000 | GET_INT | → | R | 1B+2B(CRC) |
| 87h | 1000 0111 | SET_REG_ADRS | → | W | 4B+2B(CRC) |
| 1Eh | 0001 1110 | Reserv | READ_STTS_REG | R | 2B+2B(CRC) |
| E1h | 1110 0001 | SET-CMD | → | W | 1B+2B(CRC) |
| 3Ch | 0011 1100 | Reserv | READ_SSM_DATA | R | 24B+2B(CRC) |
| C3h | 1100 0011 | Reserv | WRITE_SSM_DATA | W | 26B+2B(CRC) |

Fig. 17

| TPC | CODE | DEFINITION |
|---|---|---|
| E1h | AAh | BLOCK_READ |
| | 55h | BLOCK_WRITE |
| | 33h | BLOCK_END |
| | 99h | BLOCK_ERASE |
| | CCh | STOP |
| | 5Ah | SLEEP |
| | C3h | CLEAR_BUF |
| | 3Ch | RESET |

Fig. 18

| TPC | CODE | DEFINITION | CODE | DEFINITION |
|---|---|---|---|---|
| | AAh | BLOCK_READ | | |
| | 55h | BLOCK_WRITE | | |
| | 33h | BLOCK_END | | |
| | 99h | BLOCK_ERASE | | |
| | CCh | STOP | | |
| | 5Ah | SLEEP | | |
| | C3h | CLEAR_BUF | | |
| | 3Ch | RESET | | |
| | 60h | LOAD_ID_CMD | 72h | SET_KREC_CMD |
| | 61h | SET_Rm_CMD | 73h | MK_KREC_CMD |
| | 62h | MK_Rm_CMD | 74h | LOAD_KREC_CMD |
| | 63h | LOAD_Rm_CMD | 75h | SET_KPB_CMD |
| | 64h | LOAD_MAC1D_CMD | 76h | MK_KPB_CMD |
| E1h | 65h | SET_MAC1M_CMD | 77h | LOAD_KPB_CMD |
| | 66h | MK_MAC1M_CMD | 78h | CLR_DEC_CMD |
| | 67h | LOAD_MAC1M_CMD | 79h | SET_ICV_CMD |
| | 68h | CMP_CMD | 7Ah | MK_ICV_CMD |
| | 69h | MK_MAC2M_CMD | 7Bh | LOAD_ICV_CMD1 |
| | 6Ah | LOAD_MAC2M_CMD | 7Ch | LOAD_ICV_CMD2 |
| | 6Bh | SET_Sm_CMD | 7Dh | LOAD_ICV_CMD3 |
| | 6Ch | MK_Sm_CMD | 7Eh | LOAD_ICV_CMD4 |
| | 6Dh | LOAD_Sm_CMD | 7Fh | CMP_ICV_CMD |
| | 6Eh | SET_SeK_CMD | 80h | LOAD_NVM_CMD |
| | 6Fh | MK_SeK_CMD | 81h | ALLEW_NVM_CMD |
| | 70h | LOAD_SeK_CMD | 82h | WR_NVM_CMD |
| | 71h | CLR_IK_CMD | 83h | RD_NVM_CMD |

SECURITY UNIT FOR USE IN MEMORY CARD

BACKGROUND OF THE INVENTION

1. Technical Field of the Invention

The present invention relates generally to a security unit for use in a memory unit and/or a data processing unit to prevent unauthorized retrieval of data stored in the memory or data processing units.

2. Description of the Related Art

In conventional non-volatile memory such as EEPROM (Electrically Erasable Programmable ROM), two transistors are employed to store one bit of information. As a result, the memory area per bit is large, which limits the ability to raise the integration of the memory. On the other hand, this problem has been eliminated in a recently-developed flash memory in which one bit is stored using a single transistor according to the "all-bit-simultaneous-erase" method. In the not so distant future, it is expected that the flash memories will replace conventional record mediums such as magnetic and optical discs in many applications.

Flash memory-based memory cards or "memory sticks™" that are attachable to and detachable from a card reading/recording unit are also known. With the advent of this type of memory card, digital audio recording/reproducing units have been developed which use the memory card instead of a conventional disc shaped medium such as a CD (Compact Disc) or a mini-disc.

An audio recorder that uses a memory card as a record medium typically employs a data compressing method which allows data to be restored in a relatively high quality for recording/reproducing. Encryption techniques can be implemented to protect the copyright of music titles recorded and reproduced with this audio recorder. As an example, the audio recorder can be designed to determine, via an encryption technique, whether a memory card is invalid and thus prohibited from being used with the recorder. In other words, a valid recorder and a valid memory card in combination allow encrypted data to be decrypted. In addition to the copyright protection, encryption technologies may be used to protect the security of other information stored in the memory card.

Conventional memory cards do not have an encrypting function. Thus, when secret data is recorded to a memory card, the data is encrypted on the "set" side, i.e., in the device ("set") that the card is inserted into and which sets up the data for recording The encrypted data is then transferred to the memory card for storage. If a decryption key is also stored in the memory card, the data security of the card is compromised. On the other hand, when a decryption key is stored in a particular set, data originally encrypted by that set and recorded on a memory card cannot be decrypted by sets other than that particular set. Thus, the compatibility of memory cards cannot be maintained. To solve this problem, a system has been proposed in which a set and a memory card each have an encrypting function, thus enabling the set and memory card to be mutually authenticated. The memory card in this case can be considered a "smart card" having processing circuitry to carry out the data encryption. With this approach, both the security and compatibility of cards can be maintained.

A security unit having the above authenticating and encrypting functions may encrypt according to the Data Encryption Standard (DES). The DES is a block encrypting system in which text is block-segmented and each block segment is encrypted. With DES, input data of 64 bits is encrypted with a key of 64 (in reality, a key of 56 bits and a parity of 8 bits) and encrypted data of 64 bits is output. The DES has four use modes, one of which is a Cipher Block Chaining (CBC) mode. The CBC mode is a feedback type mode in which text of 64 bits and the preceding encrypted data (of 64 bits) are XORed and the result is input to the DES unit. In the initial state, since there is no encrypted data, an initialization vector is used. In addition, as data is being exchanged between the set and the memory card, random numbers may be generated and added to the data.

When a memory card has an internal security unit, the set may send a command to the memory card and the memory card may respond by sending data back which includes an encryption key, so as to mutually authenticate the set and the card. The encrypting circuit of the memory card has a register, the content of which is forwarded to the set in response to the command issued by the set. Another register that stores an intermediate calculation result of the encrypting process may also be required. For example, in the case where there is only one encrypting circuit, when an encrypting process is to be performed a number of times, a register is provided for storing the intermediate calculation result of the encrypting process. This register is prohibited from being externally accessed. The intermediate calculation result may be used to decrypt the encrypted data.

Accordingly, a memory card with an internal security unit may be provided with two types of registers: an accessible register for storing data to be transferred to the set in response to a command requesting the same; and a non-accessible register for storing an intermediate calculation result of the encryption process. Consequently, with two registers, the circuit scale of the security unit becomes large. This hampers the ability to increase the integration of the security unit structured as an IC chip. When the encryption process is to be performed a number of times, in order to remove a register that temporarily stores data, it is necessary to employ a plurality of encryption circuits so as to obtain all final data (encrypted data) at about the same time. Thus, in this case, the circuit scale also increases.

OBJECTS AND SUMMARY OF THE INVENTION

Accordingly, an object of the present invention is to provide a security unit that allows security to be maintained in a small circuit scale.

Another object of the invention is to provide a memory unit that includes a security unit with a small circuit scale.

In an illustrative embodiment of the invention, a security unit includes an encrypting unit for encrypting data in accordance with commands received by the security unit, and a common register for storing both intermediate results and final results of the data encryption. A switching element operatively coupled to the register selectively outputs the contents of the register. The switching element is controlled to prevent external access to the intermediate results of the encryption. The security unit is particularly useful as part of a memory unit that is attachable to a recording/reproductiondevice such as a digital audio recorder/player.

Advantageously, since a common register functions to store both the intermediate calculation result and the final result of the encryption process, it is not necessary to employ a plurality of registers for these functions. In addition, it is not necessary to utilize multiple encrypting circuits. Thus, the circuit scale of the security unit can be reduced.

BRIEF DESCRIPTION OF THE DRAWINGS

The above-mentioned objects, as well as additional objects, features, and advantages of the present invention will become readily apparent from the following detailed description thereof, which is to be read in conjunction with the accompanying drawings, in which:

FIG. 7 depicts the structure of boot and attribute information of a boot block of a flash memory;

Figure 9:
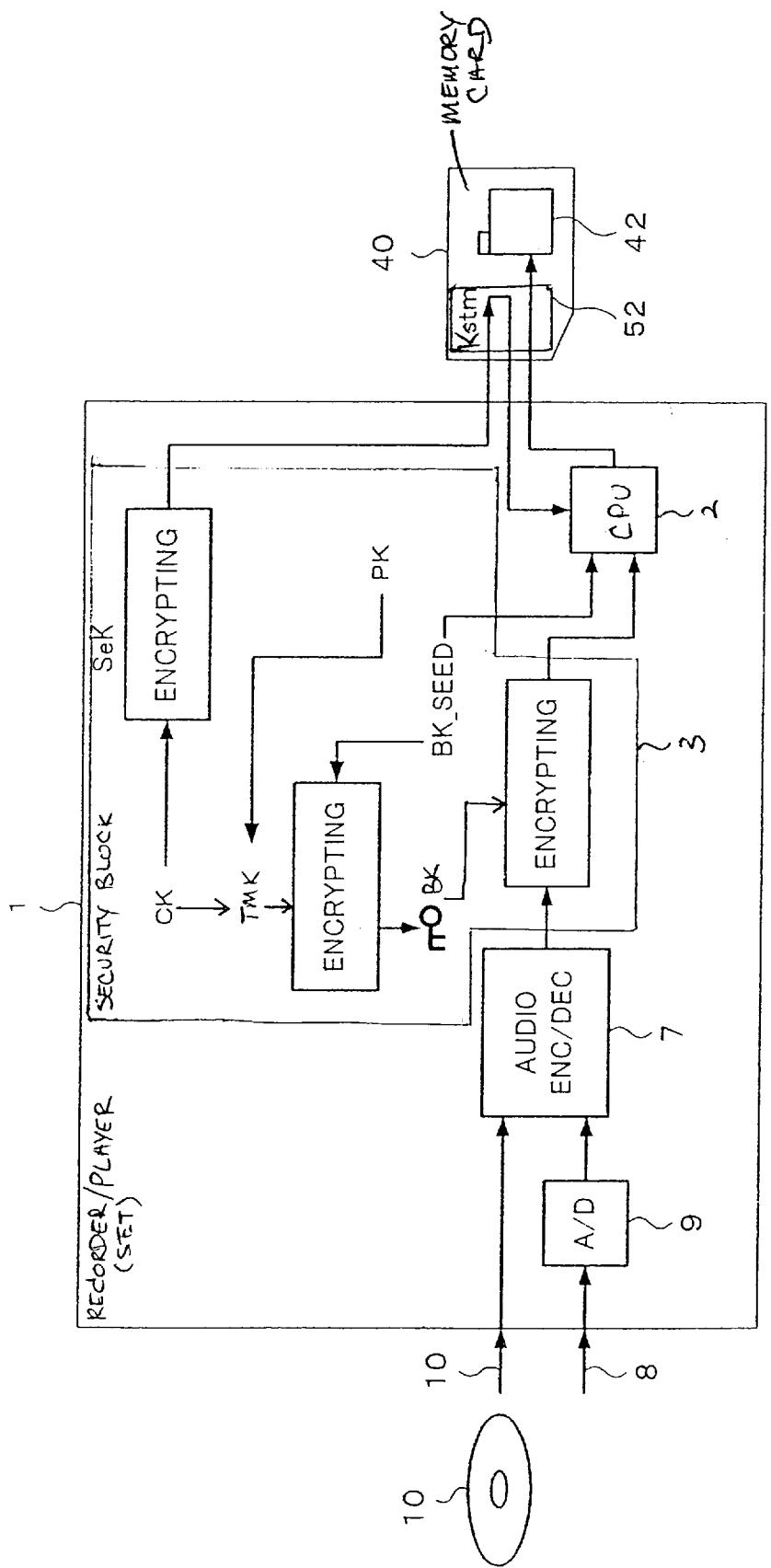
Figure 10:
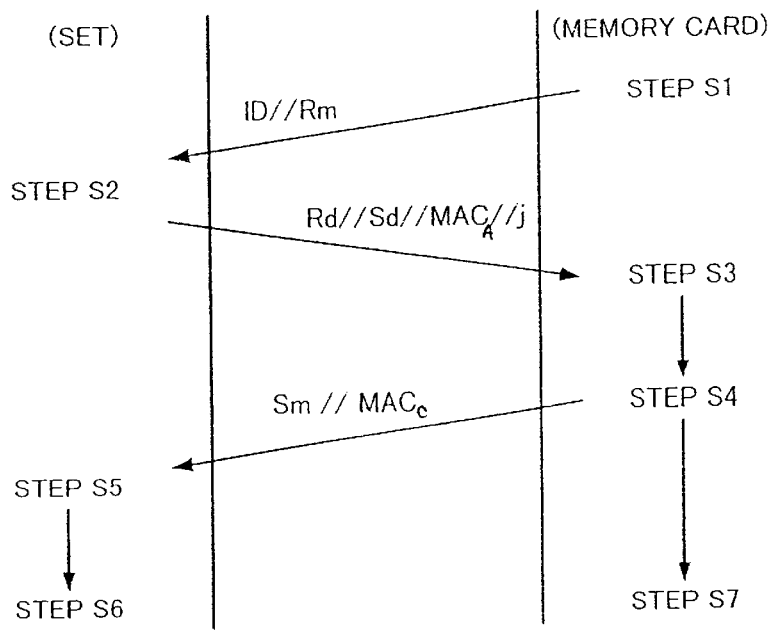
Figure 11:
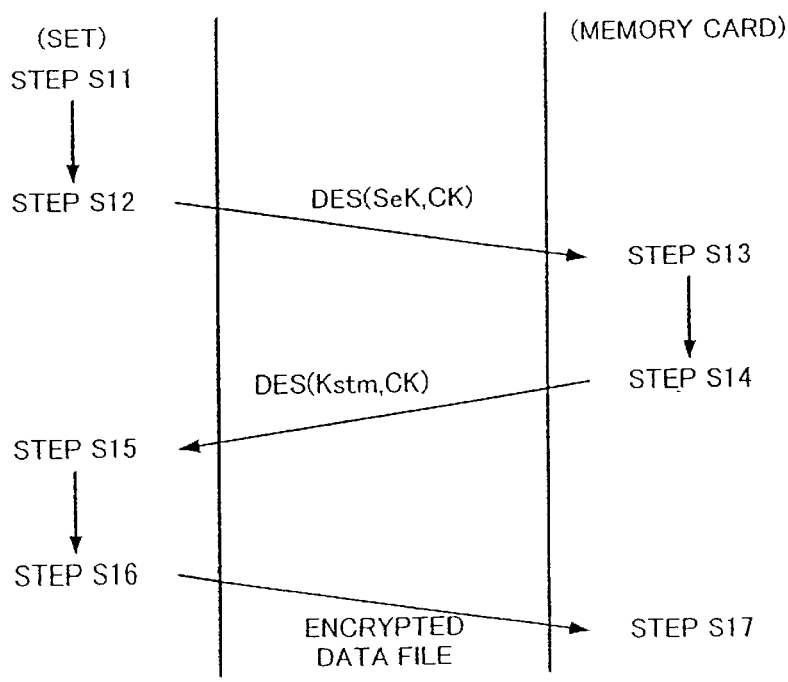
Figure 12:
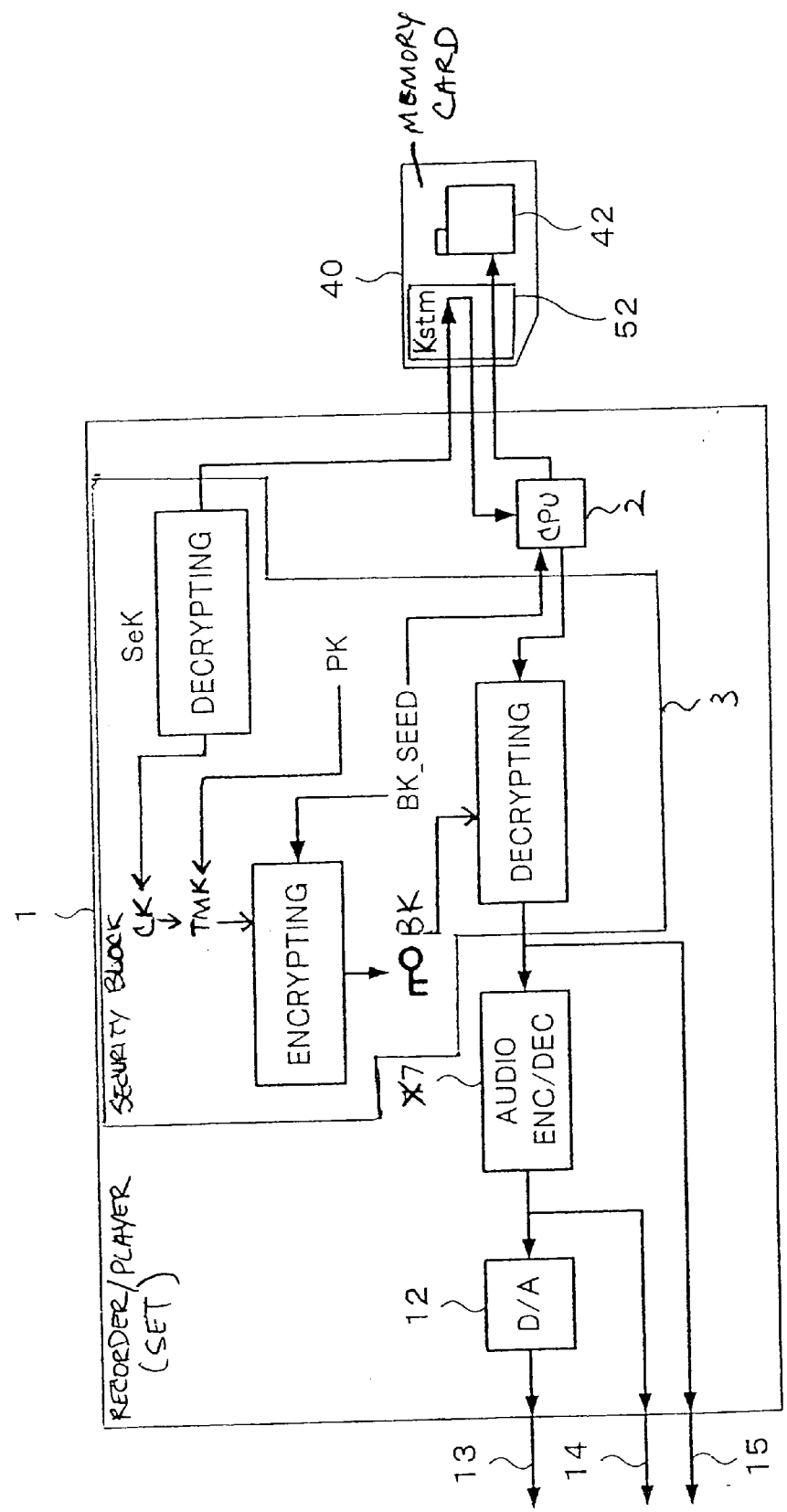
Figure 13:
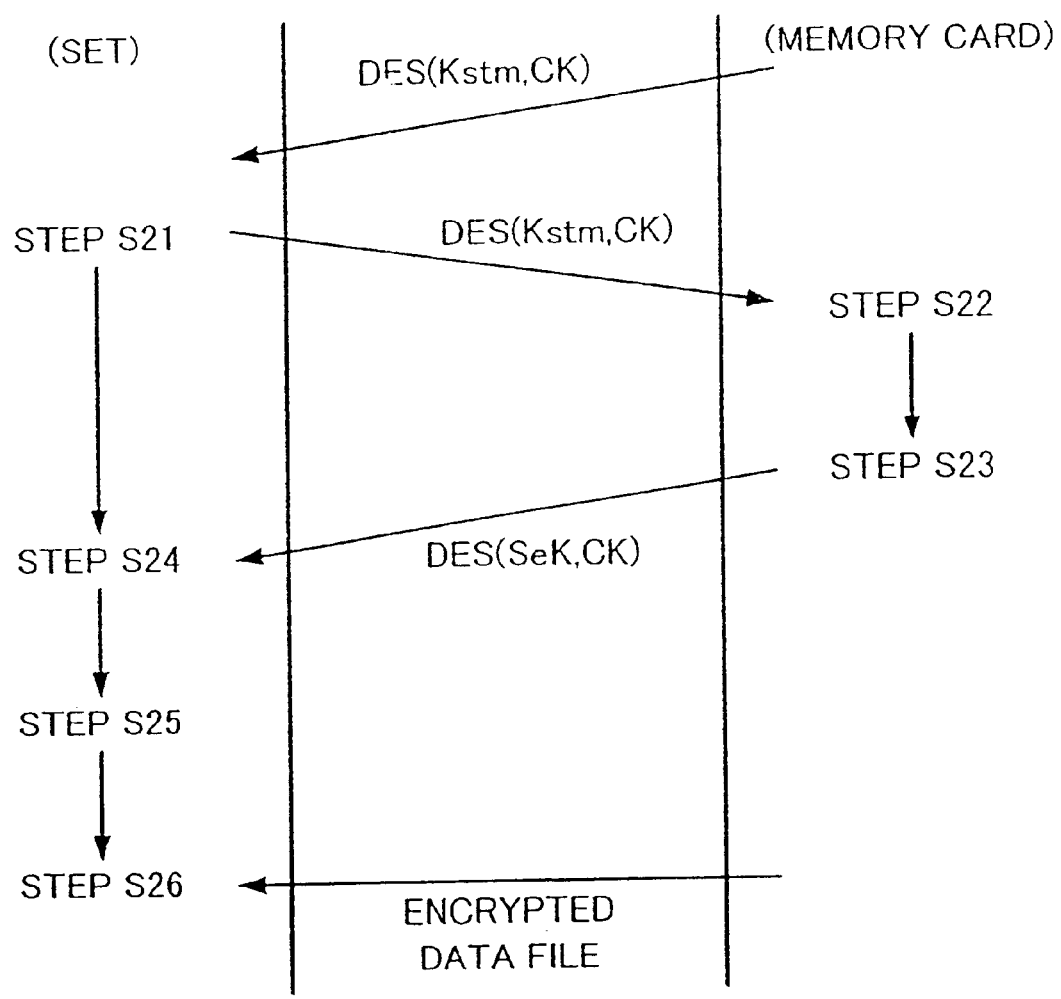
Figure 14:
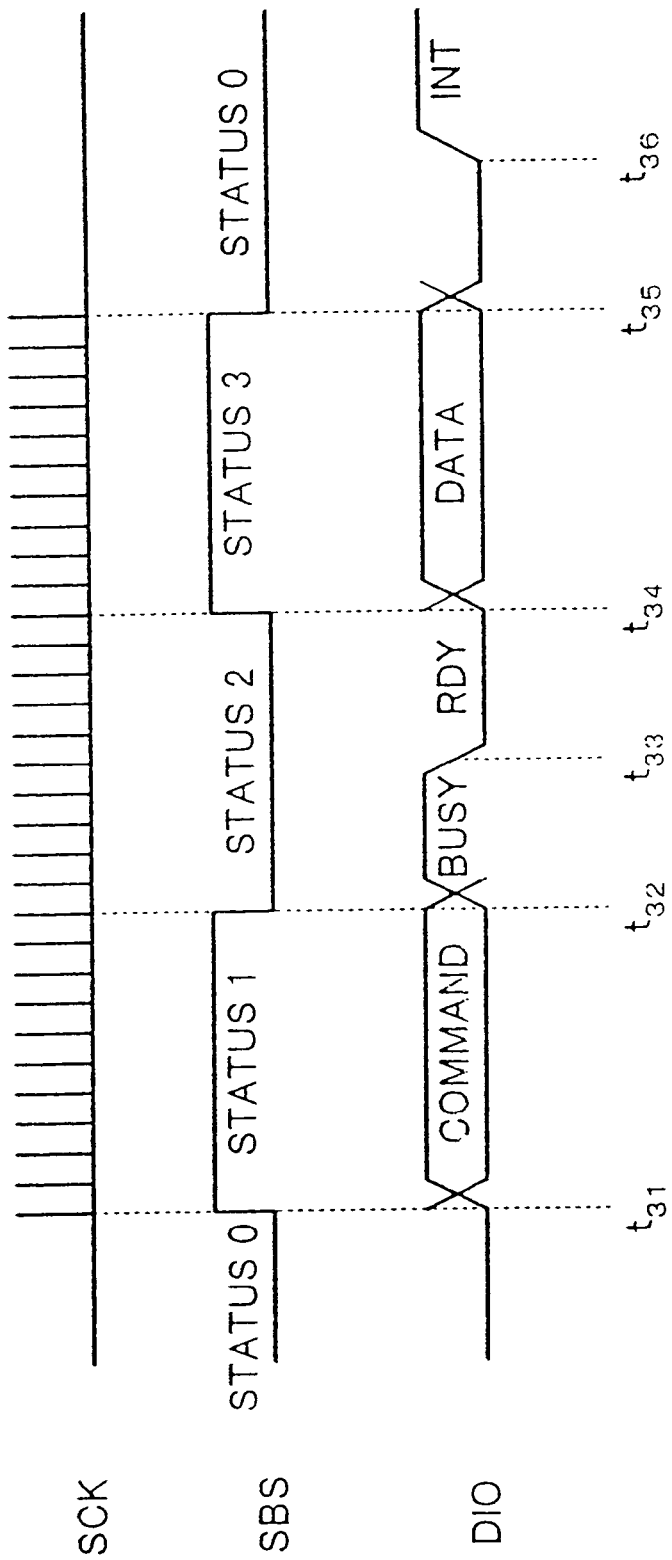
Figure 15:
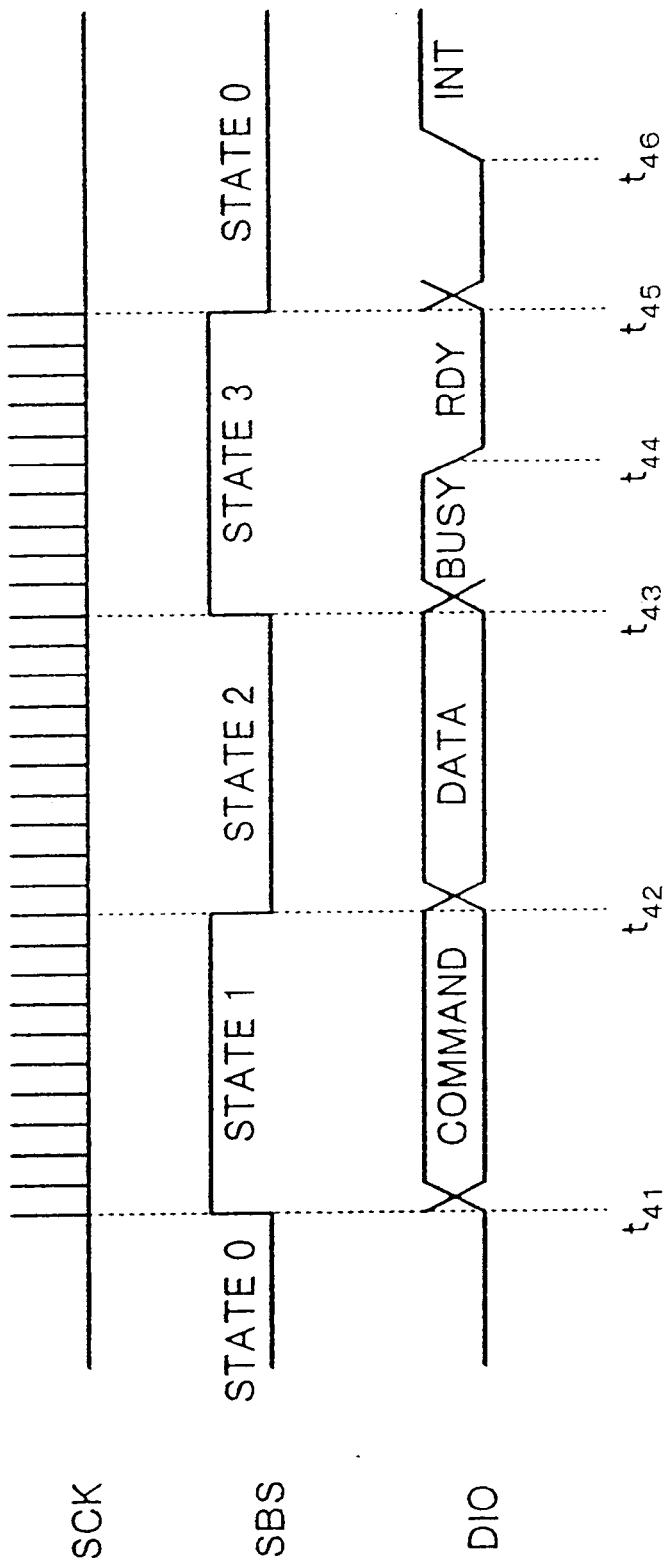
Figure 19:
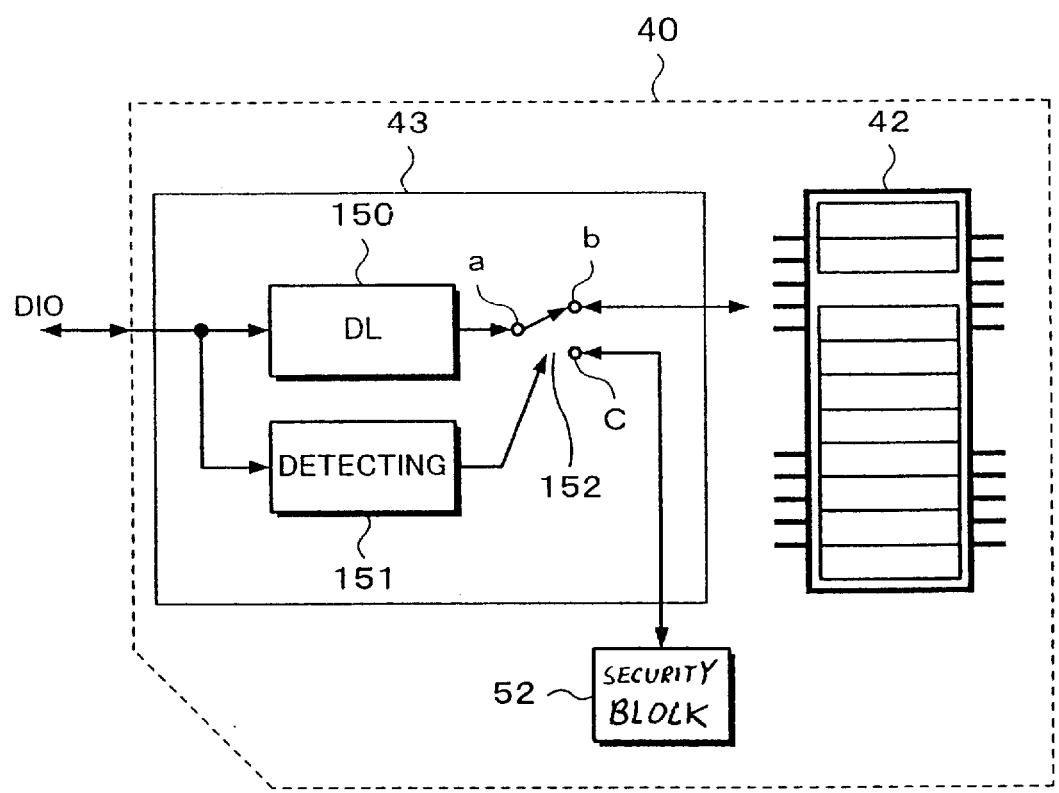
Figure 20:
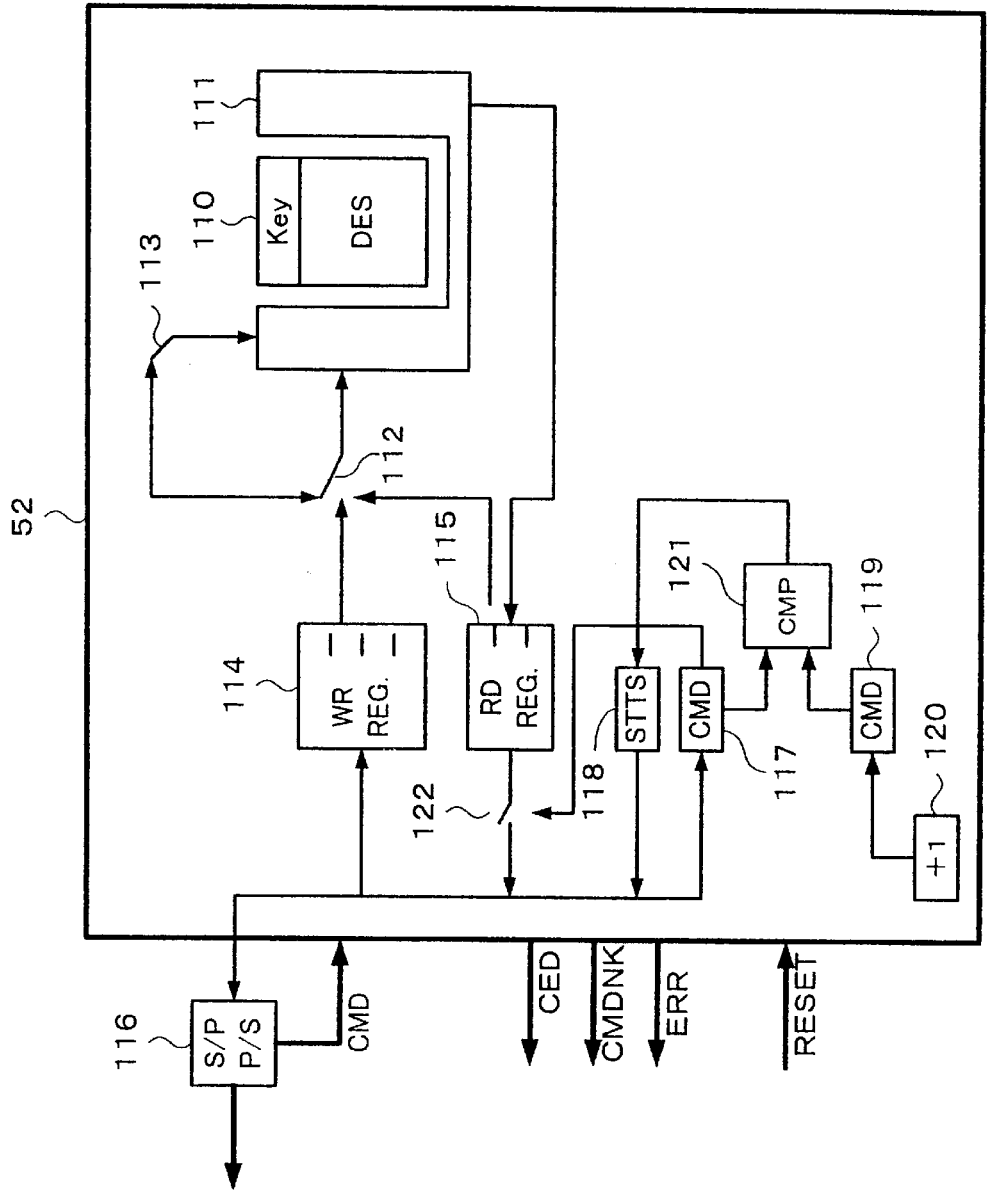

FIGS: 8A and 8B illustrate the relation between contents and a key;

FIG. 9 is a diagram to which reference will be made in explaining an encrypting process in a record operation;

FIG. 10 is a diagram to which reference will be made in explaining an authenticating process;

FIG. 11 is a diagram to which reference will be made in explaining an encrypting process in a record operation;

FIG. 12 is a diagram to which reference will be made in explaining an encrypting process in a reproducing operation;

FIG. 13 is a diagram to which reference will be made in explaining an encrypting process in a reproducing operation;

FIG. 14 is a diagram to which reference will be made in explaining an operation of an interface disposed between the recorder and the memory card;

FIG. 15 is a diagram to which reference will be made in explaining an operation of an interface disposed between the recorder and the memory card;

FIG. 16 is a table depicting examples of protocol commands that may be used in embodiments of the invention;

FIGS. 17–18 are tables illustrating commands that maybe used in embodiments of the invention;

FIG. 19 is a schematic block diagram of a memory unit in accordance with the invention; and FIG. 20 is a schematic block diagram showing the structure of a security block in accordance with the invention.

DETAILED DESCRIPTION OF THE PREFERRED EMBODIMENTS

Figure 1:
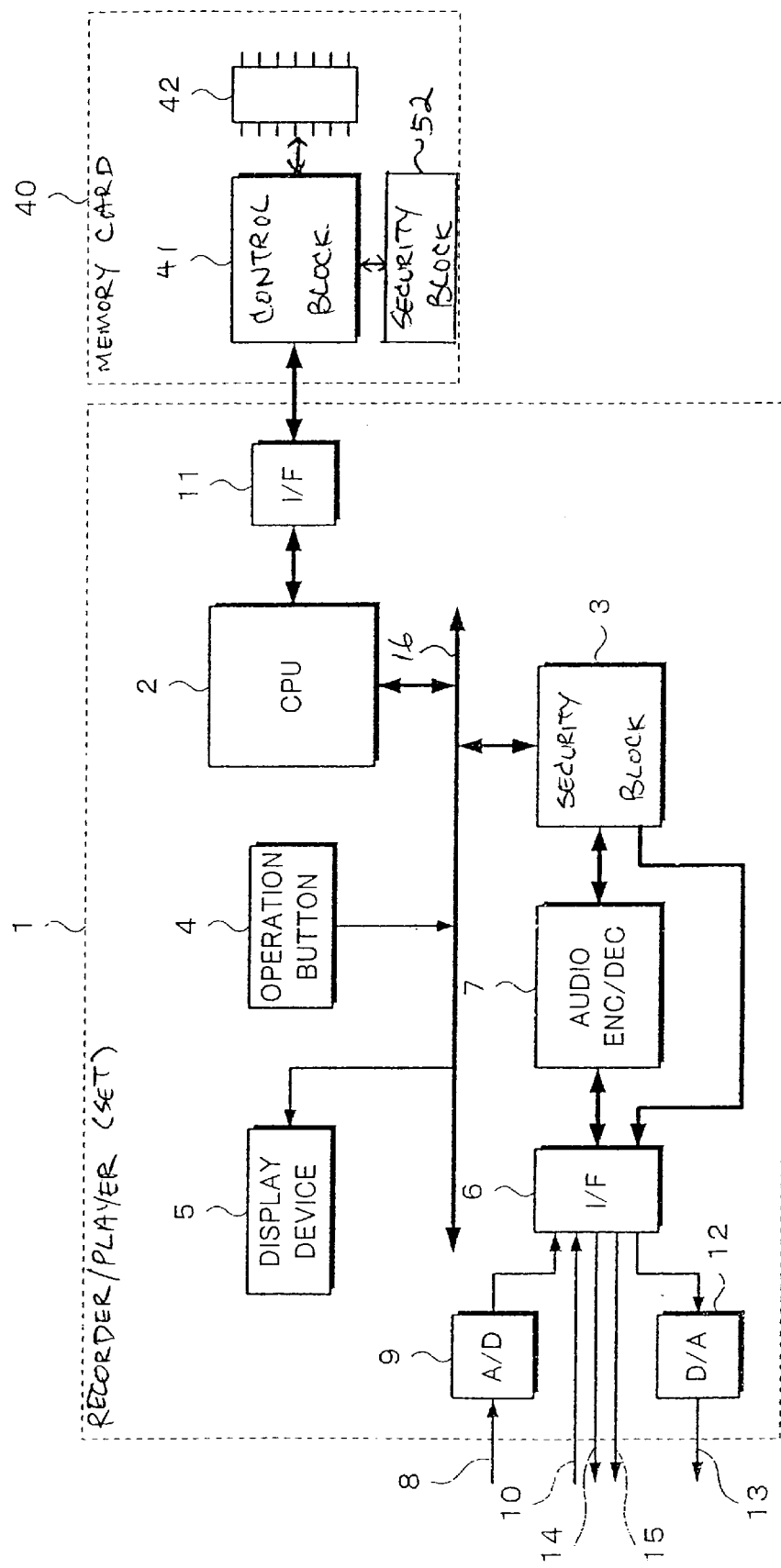
FIG. 1 depicts the overall structure of a recorder/player and a memory card in accordance with an embodiment of the present invention.

FIG. 1 is a block diagram showing the structure of a digital audio recorder/player 1 according to a preferred embodiment of the present invention. Digital audio recorder/player 1 records and reproduces a digital audio signal using a detachable memory card (or a Memory Stick™) 40. Recorder/player 1 may be a part of an audio system along with an amplifying unit (not shown), speakers (not shown), a CD player (not shown), an MD recorder (not shown), a tuner (not shown), and so forth. However, it should be noted that the present invention may be applied to other audio sets. For instance, recorder/player 1 may be a portable device. The present invention may also be applied to a set top box that records digital audio data that is circulated via satellite data communication, digital broadcast, or the Internet, etc. Moreover, the present invention may be applied to a system that records/reproduces moving picture data and still picture data rather than audio data. A system according to an embodiment of the present invention may also record and reproduce additional information, such as picture and text, other than a digital audio signal.

Recorder/player 1 has a Central Processing Unit ("CPU") 2, a security block 3, an operation button 4, and a display device 5. Security block 3, operation button 4, and display device 5 are connected to CPU 2 through a bus 16. Security block 3 includes a Data Encryption Standard ("DES") encrypting circuit. Data such as a record command, a reproduction command, or the like corresponding to a user's operation of operation button 4 is supplied to CPU 2 through bus 16. Various information, the operation state of recorder/player 1, and so forth are displayed on display device 5. An audio interface 6 is disposed between an external input/output, which will be described in further detail below, and an internal audio encoder/decoder 7.

As will be described later, memory card 40 is an IC chip having a flash memory (non-volatile memory) 42, a control block 41, a security block 52 (security block 52 may include a DES encrypting circuit), a communication interface, a register, and so forth. Memory card 40 is attachable to recorder/player 1 and detachable therefrom. According to an embodiment, recorder/player 1 is also compatible with a memory card that does not have an encrypting function (namely, security block 52).

Audio encoder/decoder 7 encodes digital audio data in accordance with a highly efficient encoding method to be-written to memory card 40. In addition, encoder/decoder 7 decodes encoded data read from memory card 40. The highly efficient ATRAC3 format encoding method, which is a modification of the Adaptive Transform Acoustic Coding ("ATRAC") format used for MDs, may be used.

In the ATRAC3 format, audio data sampled at 44.1 kHz and quantized with 16 bits is encoded with high efficiency. The minimum data unit of audio data for processing is a sound unit ("SU"). 1 SU contains data of 1024 samples, thus comprising (1024×16 bits×2 channels) bits, that is compressed to data of several hundred bytes. The duration of 1 SU is approximately 23 msec. Under this highly efficient encoding method, the size of compressed data is approximately 10 times smaller than that of the original data. As compared to the ATRAC1 format used in MDs, an audio signal compressed and decompressed according to the ATRAC3 format is less deteriorated in audio quality.

Illustratively, an analog input 8 supplies a reproduction output signal of an MD, a tuner, or a tape to an Analog-to-Digital ("A/D") converter 9. A/D converter 9 converts the signal from analog input 8 to a digital audio signal (sampling frequency=44.1 kHz; the number of quantizing bits=16) and supplies the converted digital audio signal to audio interface 6. A digital input 10 supplies a digital output signal of an MD, a CD, a digital broadcast signal, or network circulated audio data to audio interface 6. The digital input signal is transmitted through, for example, an optical cable. Audio interface 6 selects an input digital audio signal from A/D converter 9 and digital input 10 and supplies the selected input digital audio signal to audio encoder/decoder 7.

Audio encoder/decoder 7 encodes the input digital audio signal and supplies the encoded data to security block 3.

Security block 3 encrypts the encoded data received from audio encoder/decoder 7 so as to protect copyrights on the contents of said data (in this example, a digital audio signal). Security block 3 of recorder/player 1 may have a plurality of master keys and a unit unique storage key. In addition, security block 3 may have a random number generating circuit (not shown). When memory card 40 having security block 52 is attached to recorder/player 1, security block 3 of recorder/player 1 determines whether or not memory card 40 is valid (namely, authenticates memory card 40). After security block 3 of recorder/player 1 has properly authenticated memory card 40, security block 3 of recorder/player 1 and security block 52 of memory card 40 share a session key.

The encrypted audio data that is output from security block 3 is supplied to CPU 2. CPU 2 communicates with memory card 40 through a bidirectional serial interface 11. In an embodiment, memory card 40 is attached to an attaching/detaching mechanism (not shown) of recorder/player 1. CPU 2 writes the encrypted data to flash memory 42 of memory card 40. The encrypted data is serially transmitted between CPU 2 and memory card 40.

CPU 2 reads encrypted audio data from memory card 40 through memory interface 11 and supplies such data to security block 3. Security block 3 decrypts the encrypted audio data. The decrypted audio data is supplied to audio encoder/decoder 7 which decodes the decrypted audio data. An output signal of audio encoder/decoder 7 is supplied to a D/A converter 12 through audio interface 6. D/A converter 12 converts the digital audio data into an analog audio signal and transmits the same through output 13. Audio data received from audio encoder/decoder 7 and decrypted data received from security block 3 may also be outputted as digital output signals through outputs 14 and 15, respectively, through interface 6.

Figure 2:
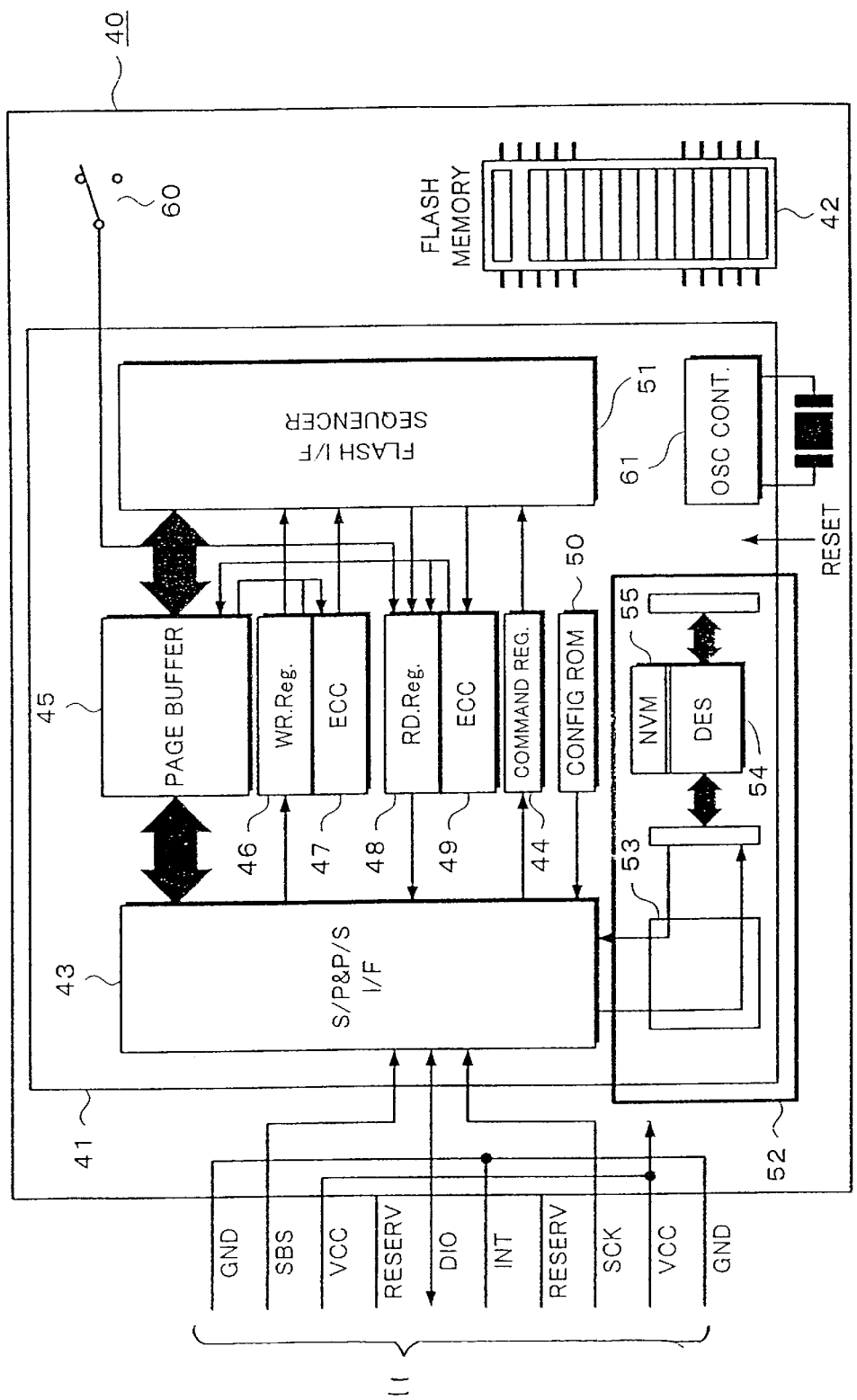
FIG. 2 depicts the internal structure of a security type memory card in accordance with an embodiment of the present invention.

FIG. 2 is a block diagram showing the internal structure of memory card 40. Memory card 40 is a one chip integrated circuit ("IC") comprising control block 41, security block 52, and flash memory 42. As shown in FIG. 2, bidirectional serial interface 11 disposed between CPU 2 of recorder/player 1 and memory card 40 is composed of 10 lines, which include a clock line SCK for transmitting the clock signal that is transmitted along with data, a status line SBS for transmitting a status signal, a data line DIO for transmitting data, an interrupt line INT, two GND lines, two VCC lines, and two reserved lines.

Four major lines of the 10 lines are clock line SCK, status line SBS, data line DIO, and interrupt line INT. Clock line SCK is used to send a clock signal to synchronize data transfer. Status line SBS is used to send a status signal that represents the status of memory card 40. Data line DIO is used to input and output a command and encrypted audio data. Interrupt line INT is used to send an interrupt request signal from memory card 40 issues to CPU 2 of recorder/player 1. When memory card 40 is attached to recorder/player 1, an interrupt signal is generated. In another embodiment, the interrupt signal is sent through data line DIO in which case interrupt line INT is grounded and not used.

A serial/parallel and parallel/serial interface block ("S/P and P/S IF block") 43 is an interface of control block 41 coupled to interface 11. S/P and P/S IF block 43 converts serial data received from recorder/player 1 into parallel data. It also converts parallel data of control block 41 into serial data, and supplies the serial data to recorder/player 1. In addition, S/P and P/S IF block 43 separates a command and data received through data line DIO into those for accessing flash memory 42 and those for performing an encrypting process.

In other words, with the data line DIO, after a command is sent, data is sent. S/P and P/S IF block 43 determines whether the received command and data are for accessing flash memory 42 or for performing the encrypting process by the code of the received command. Corresponding to the determined result, a command for accessing flash memory 42 is stored to a command register 44 and data is stored to a page buffer 45 and a write register 46. In association with write register 46, an error correction code encoding circuit 47 is disposed. Error correction code encoding circuit 47 generates a redundant code of an error correction code for data temporarily stored in page buffer 45.

Output data of command register 44, page buffer 45, write register 46, and error correction code encoding circuit 47 is supplied to a flash memory interface and sequencer ("memory IF and sequencer") 51. Memory IF and sequencer 51 is an interface coupled to flash memory 42 and controls data exchanged between flash memory 42 and control block 41, for example, data is written to flash memory 42 through memory IF and sequencer 51.

Data read from flash memory 42 is supplied to page buffer 45, a read register 48, and an error correcting circuit 49 through memory IF and sequencer 51. Error correcting circuit 49 corrects an error(s) of data stored in page buffer 45. Error corrected data output from page buffer 45 and data output from read register 48 are supplied to S/P and P/S IF block 43 and then supplied to CPU 2 of recorder/player 1 through serial interface 11.

To protect copyrights on the contents (audio data compressed in the ATRAC3 format ("ATRAC3 data")) written to flash memory 42, security block 3 of recorder/player 1 and security block 52 of memory card 40 cooperate to encrypt the contents. Security block 52 has a buffer memory 53, a DES encrypting circuit 54, a non-volatile memory 55, and so forth.

As shown in FIG. 2, a configuration ROM 50 is disposed in control block 41. Configuration ROM 50 stores version information and various kinds of attribute information of memory card 40. Memory card 40 has a write protection switch 60 operable by a user. When switch 60 is placed in a write protection position, even if recorder/player 1 sends an erase command to flash memory 42, data stored in flash memory 42 is prohibited from being erased. When switch 60 is placed in a non-write protection position, data stored in flash memory 42 is erasable. An oscillator 61 generates a clock signal used as a timing reference for processes performed in memory card 40.

Security block 52 of memory card 40 has a plurality of authentication keys and a memory card unique storage key. Non-volatile memory 55 stores a decryption or storage key that cannot be accessed from outside of security block 52. Security block 52 has a random number generating circuit. Security block 52 can authenticate recorder/player 1 (which may form a dedicated system that uses a predetermined data format) and share a session key therewith. A contents key for encrypting ATRAC3 data is encrypted with the session key and sent between recorder/player 1 and memory card 40. As with security block 52 of memory card 40, security block 3 of recorder/player 1 has a set unique storage key. When contents have been encrypted and are to be stored to flash memory 42, a corresponding contents key is encrypted using the storage key and stored with the encrypted contents.

Figure 3:
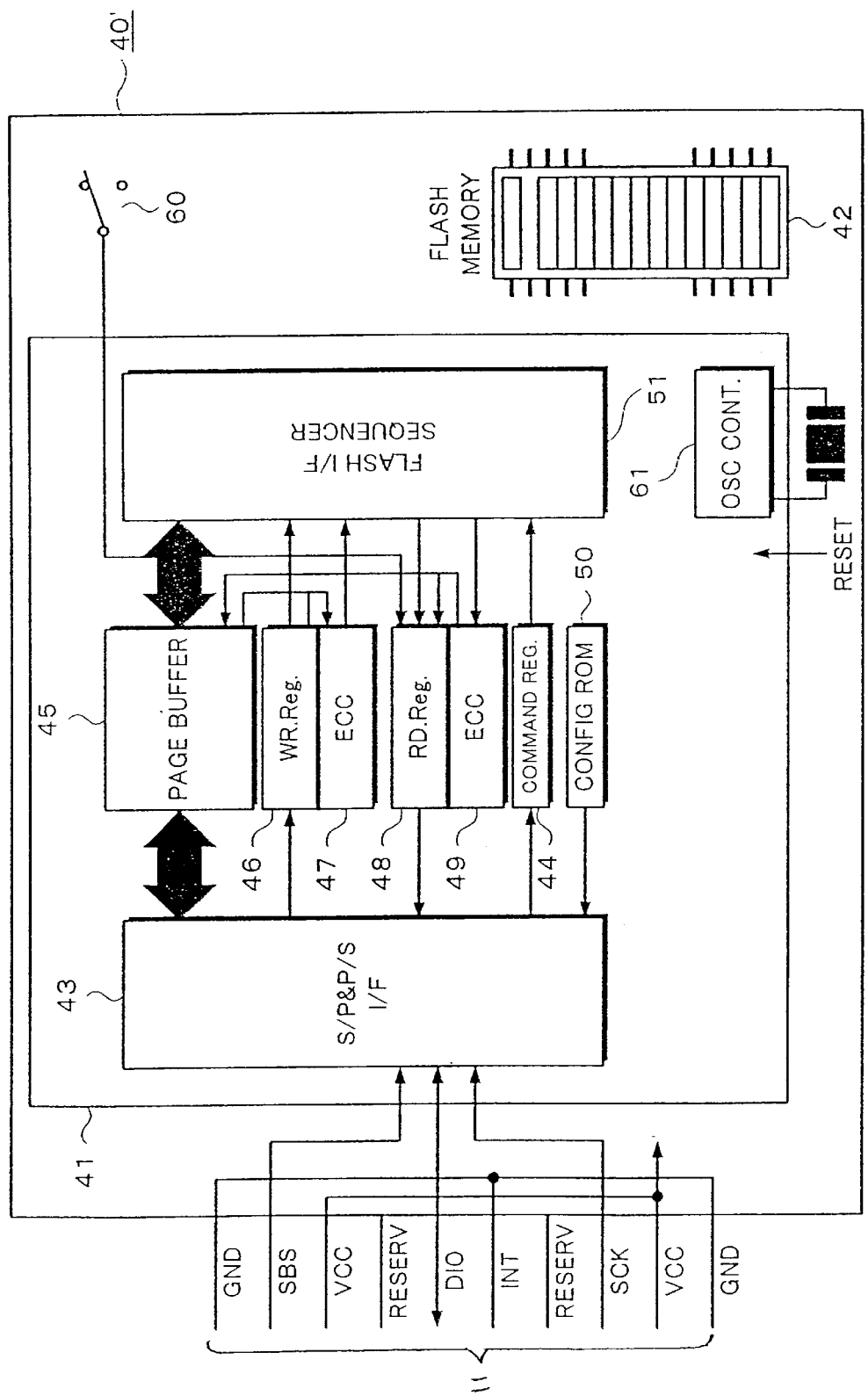
FIG. 3 depicts the internal structure of a non-security type memory card in accordance with an embodiment of the present invention.

FIG. 3 shows a memory card 40' that does not have an encrypting function. In other words, memory card 40' is a non-security type memory card. Unlike memory card 40 shown in FIG. 2, memory card 40' does not include security block 52. The remaining structure of memory card 40' is substantially the same as that of memory card 40. In addition, the size and shape of memory card 40' may be the same as that of memory card 40. Since recorder/player 1 shown in FIG. 1 is a security type recorder, recorder/player 1 and the memory card 40 are mutually authenticated and a key is communicated therebetween. When memory card 40', shown in FIG. 3, is attached to recorder/player 1, recorder/player 1 determines that memory card 40' is a non-security type memory card and that it cannot be used with recorder/player 1.

There are several methods by which recorder/player 1 may determine the type of memory card attached thereto. As one example, when memory card 40' is attached to recorder/player 1, a key is sent from recorder/player 1 to memory card 40' so as to authenticate it. Since memory card 40' does not send a correct response to recorder/player 1, recorder/player 1 determines that memory card 40' is not of the security type after a time-out period. As another example, when memory card 40 or 40' is attached to recorder/player 1, identification information that represents whether or not the memory card is of the security type may be recorded in a predetermined area (boot area) of the memory card. Upon reading such identification information, recorder/player 1 can determine the type of memory card attached thereto.

In addition to recorder/player 1 shown in FIG. 1, a unit that can use non-security type memory card 40' is presented according to the present invention. One example is a digital movie camera that records a picture photographed with a Charge Coupled Device ("CCD") camera to memory card 40' and reproduces the photographed picture therefrom. As will be described later, according to an embodiment of the present invention, to enhance the compatibility of memory card 40, it is structured so that a non-security device such as a digital movie camera can record and reproduce data using memory card 40. In other words, as described above, S/P and P/S IP block 43 has a function for separating command and data for flash memory 42 and those for security block 52.

In accordance with an embodiment, memory cards 40 and 40' store data using the File Allocation Table ("FAT") file system of a personal computer as with a disc shaped recording medium. Flash memory 42 comprises an Initial Program Load ("IPL") area, a FAT area, and a route directory. The IPL area stores the address of a program that is initially loaded to a memory of recorder/player 1. In addition, the IPL area stores various kinds of information of flash memory 42. The FAT area stores data with respect to memory blocks in flash memory 42. In other words, the FAT area stores values that represent non-used blocks, the next block number, bad blocks, and the last block. The route directory area stores a directory entry (file attribute, updated date (year, month, and day), start cluster, file size, and so forth).

In addition to the file management system defined in the format of memory cards 40 and 40', file management information (a track information management file) for a music file may be defined. The track information management file is stored in flash memory 42 using a user block of memory cards 40 and 40'. Thus, even if the FAT of memory card 40 or 40' is broken, the file can be restored.

The track information management file is created by CPU 2. When the power of recorder/player 1 is turned on, CPU 2 determines whether or not memory card 40 or 40' has been attached to recorder/player 1. When memory card 40 or 40' has been attached to recorder/player 1, CPU 2 reads a boot block of flash memory 42. In accordance with the identification information of the boot block, CPU 2 determines whether or not the attached memory card is a security type memory card.

If memory card 40 is attached (i.e., security type), CPU 2 performs an authenticating process. Other data read from memory card 40 is stored in a memory (not shown) managed by CPU 2. In flash memory 42 of memory card 40 or 40' that has not been used, before it is shipped, a FAT and a route direction are written. When data is recorded, the track information management file is created. After CPU 2 has authenticated memory card 40, recorder/player 1 records or reproduces an encrypted ATRAC3 data file.

When data is recorded, a record command that is issued corresponding to the operation of operation button 4 is sent to CPU 2. The input audio data is compressed by encoder/decoder 7. The ATRAC3 data received from encoder/decoder 7 is encrypted by security block 3. CPU 2 stores the encrypted ATRAC3 data to flash memory 42 of memory card 40. Thereafter, the FAT and the track information management file are updated. Whenever the file is updated (namely, after audio data is recorded), the FAT and the track information management file are rewritten to a memory controlled by CPU 2. When memory card 40 is detached from recorder/player 1 or the power of recorder/player 1 is turned off, the final FAT and the track information management file are supplied from the memory to flash memory 42 of memory card 40. In this case, whenever audio data has been recorded, the FAT and the track information management file stored in flash memory 42 may be rewritten. When data is edited, the contents of the track information management file are updated.

Figure 4:
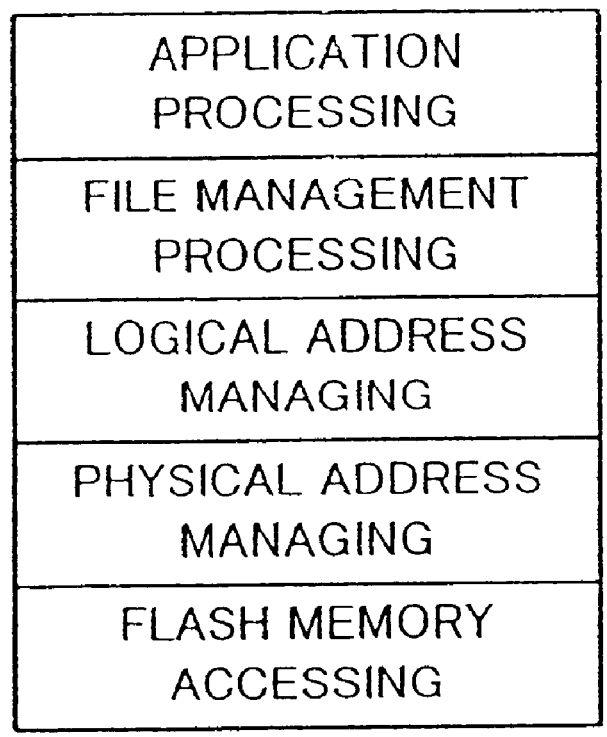
FIG. 4 depicts the structure of a file system processing hierarchy of a flash memory according to an embodiment of the present invention.

FIG. 4 is a schematic diagram showing the hierarchy of the file system processes of a computer system that uses memory card 40 or 40' as a storage medium. As shown therein, the top hierarchical level is an application process layer. The application process layer is followed by a file management process layer, a logical address management layer, a physical address management layer, and a flash memory access layer. The file management process layer is the FAT file system. Physical addresses are assigned to individual blocks of flash memory 42 in memory card 40 or 40'. The relationship between the blocks of flash memory 42 and the physical addresses thereof does not vary. Logical addresses are addresses that are logically handled on the file management process layer.

Figure 5:
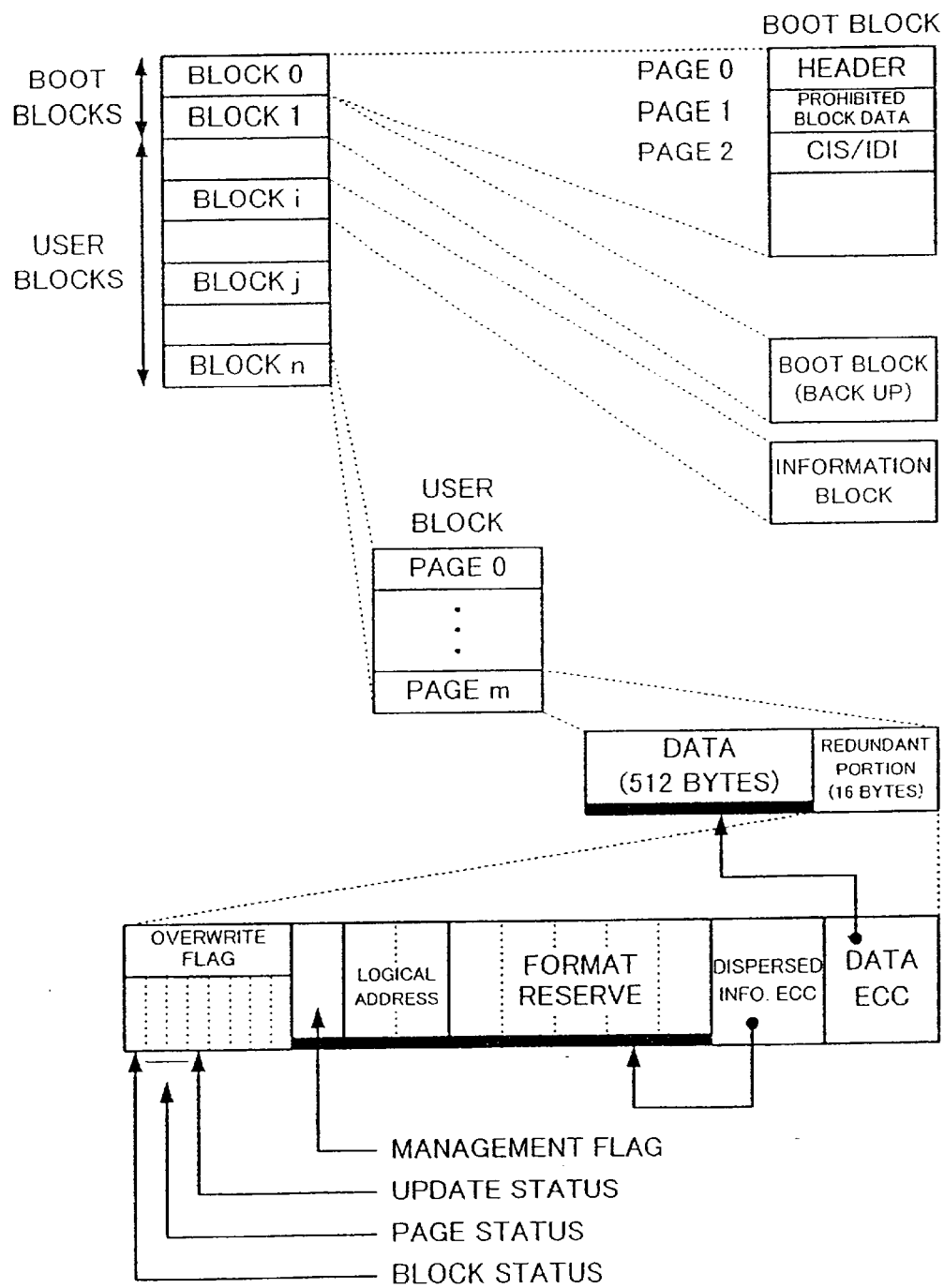
FIG. 5 illustrates a format of a physical data structure of a flash memory.

FIG. 5 is a schematic diagram showing the physical structure of data handled in flash memory 42 of memory card 40 or 40'. In flash memory 42, a data unit (referred to as a segment) is divided into a predetermined number of blocks (fixed length). One block is divided into a predetermined number of pages (fixed length). In flash memory 42, data is erased one block at a time. Data is written to flash memory 42 or read therefrom one page at a time. The size of each block is the same. Likewise, the size of each page is the same. One block is composed of page 0 to page m. One block may have a storage capacity of 8 KB (kilobytes) or 16 KB and one page may have a storage capacity of 512 B (bytes). When one block has a storage capacity of 8 KB, the total storage capacity of flash memory 42 is 4 MB (512 blocks) or 8 MB (1024 blocks). When one block has a storage capacity of 16 KB, the total storage capacity of flash memory 42 is 16 MB (1024 blocks), 32 MB (2048 blocks), or 64 MB (4096 blocks).

One page is composed of a data portion of 512 bytes and a redundant portion of 16 bytes. The first three bytes of the redundant portion is an overwrite portion that is rewritten whenever data is updated. The first three bytes successively contain a block status area, a page status area, and an update status area. The remaining 13 bytes of the redundant portion are fixed data that depends on the contents of the data portion. The 13 bytes contain a management flag area (1 byte), a logical address area (2 bytes), a format reserve area (5 bytes), a dispersion information Error-Correcting Code ("ECC") area (2 bytes), and a data ECC area (3 bytes). The dispersion information ECC area contains redundant data for an error correction process for the management flag area, the logical address area, and the format reserve area. The data ECC area contains redundant data for an error correction process for the data in the 512-byte data portion.

The management flag area contains a system flag (1: user block, 0: boot block), a conversion table flag (1: invalid, 0: table block), a copy prohibition flag (1: copy allowed, 0: copy not allowed), and an access permission flag (1: free, 0: read protect).

The first two blocks—blocks 0 and 1 are boot blocks. Block 1 is a backup of block 0. The boot blocks are top blocks that are valid in memory card 40 or 40'. When memory card 40 or 40' is attached to recorder/player 1, the boot blocks are accessed first. The remaining blocks are user blocks. Page 0 of a boot block contains a header area, a system entry area, and a boot and attribute information area. Page 1 of a boot block contains a prohibited block data area. Page 2 of a boot block contains a CIS (Card Information Structure)/IDI (Identify Drive Information) area.

Figure 6:
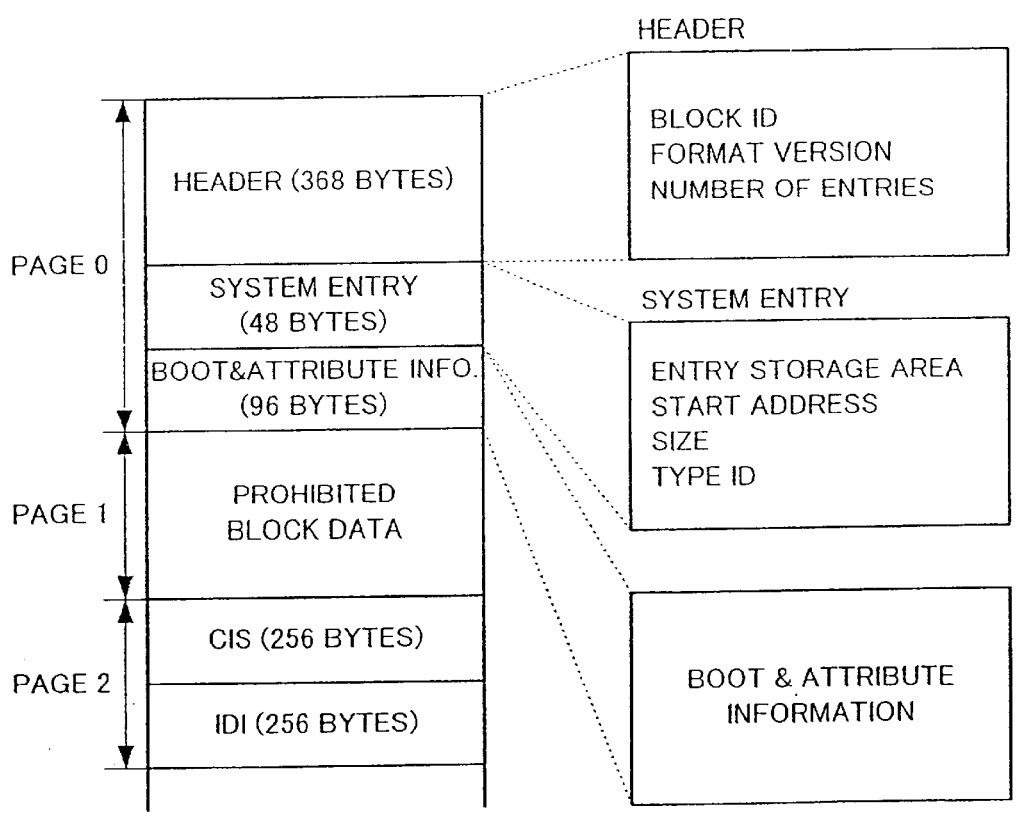
FIG. 6 depicts the structure of a boot block of a flash memory.

FIG. 6 shows the format of pages 0, 1, and 2 of a boot block. A header (368 bytes) of a boot block stores a boot block ID, a format version, and the number of valid entries of the boot block. A system entry (48 bytes) stores the start position of the prohibited block data, the data size thereof, the data type thereof, the data start position of CIS/IDI, the data size thereof, and the data type thereof. The boot and attribute information contains memory card type (read only type, rewritable type, or hybrid type), the block size, the number of blocks, the number of total blocks, the security/non-security type, the card fabrication data (date of fabrication), and so forth.

FIG. 7 shows the structure of the boot & attribute information (96 bytes) shown in FIG. 6. The boot & attribute information may include the class of the memory card, the type (read only, read write enable, hybrid of both types, etc.), the block size, the number of blocks, the total number of blocks, the security type/non-security type, the production data (the date of production: year, month, day), and so forth. Recorder/player 1 determines whether or not a memory card is of the security type using the security type information (one byte). In FIG. 7, (*1) represents a data item that recorder/player 1 reads and checks when a memory card is attached thereto; and (*2) represents production/quality management data item.

It is appreciated that the insulation film of flash memory 42 deteriorates whenever data stored therein is rewritten. Thus, the service life of memory card 40 or 40' is limited by the number of times flash memory 42 is rewritten. Accordingly, it is preferable to prevent a particular storage area (block) of flash memory 42 from being repeatedly accessed. Consequently, when data stored at a particular physical address is to be rewritten, updated data is not written back to the same block. Instead, the updated data is written to a block that has not been used. Thus, after data is updated, the relationship between physical addresses and logical addresses varies. When such a process (referred to as a swapping process) is performed, the same block is prevented from being repeatedly accessed. Thus, the service life of flash memory 42 can be prolonged.

Since a logical address corresponds to data written to a block, even if updated data is physically moved to another block, the same logical address may be maintained in the FAT. The swapping process causes the relationship between logical addresses and physical addresses to vary. Thus, a conversion table that converts logical addresses into physical addresses is changed accordingly when such a swapping process is performed. By referencing the conversion table, a physical address corresponding to a logical address designated by the FAT is obtained. Thus, the updated data can be properly accessed using the same logical address.

The logical address—physical address conversion table is stored in a memory Random Access Memory ("RAM") by CPU 2. However, when the storage capacity of the RAM is small, the logical address—physical address conversion table can be stored in flash memory 42. This table basically correlates logical addresses (two bytes) arranged in ascending order with physical addresses (two bytes). Since, in one embodiment, the storage capacity of flash memory 42 is 128 MB (8192 blocks), with two bytes, 8192 addresses can be represented. In addition, the logical address—physical address conversion table is managed segment by segment. The size of the logical address—physical address conversion table is proportional to the storage capacity of flash memory 42. If the storage capacity of flash memory 42 is 8 MB (two segments), two pages corresponding to the two segments are used for the logical address—physical address conversion table. If the logical address—physical address conversion table is stored in flash memory 42, one bit of the management flag of the redundant portion of each page represents whether or not a relevant block has been stored in the logical address—physical address conversion table.

Next, the security protecting function will be further described. First of all, with reference to FIGS. 8A and 8B, the relation between a key and contents will be described. Each tune (or song) stored in flash memory 42 may be referred to as a track. FIG. 8A illustrates one track stored in flash memory 42. As shown in FIG. 8A, each track includes a key area (header) 101. A contents key CK created for each track (title) of encrypted audio data is encrypted with a memory card unique storage key Kstm and the resultant data is stored to key area 101. DES is used for an encrypting process for the contents key CK and the storage key Kstm. DES (Kstm, CK) represents that the contents key CK is encrypted with the storage key Kstm. An encoded value preferably has 64 bits composed of 56 bits of data and 8 bits of an error detection by Cyclical Redundancy Checking ("CRC").

Each track is divided into parts 102. A parts key PK is recorded with each part. Illustratively, the track shown in FIG. 8A comprises only one part 102. Part 102 is a set of blocks 103 (16 KB each). Each block 103 stores a block seed BK_SEED and an initial vector INV. The part key PK is paired with a contents key CK so as to create a block key BK for encrypting the contents. In other words, BK=DES (CK (+) PK, BK_SEED) (56 bits+8 bits) (where (+) represents an exclusive-OR). The initial vector INV is an initial value for an encrypting/decrypting process for a block.

Figure 8B:
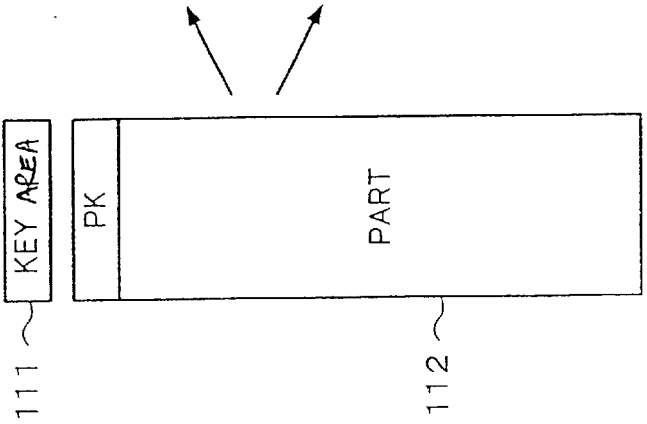
Figure 8A:
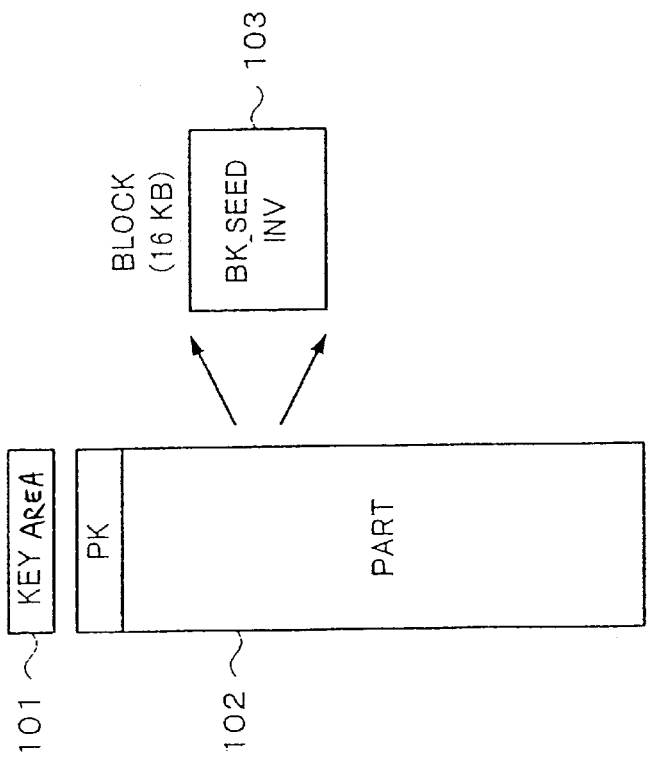

FIG. 8B relates to contents data in recorder/player 1. A contents key CK for each track of contents is decrypted and the resultant data is re-encrypted with a recorder unique storage key Kstd. The re-encrypted data is stored in a key area 111. In other words, the decrypting process is denoted by IDES (Kstm, CK) (56 bits+8 bits). The re-encrypting process is denoted by DES (Kstd, CK) (56 bits+8 bits). A part key PK for creating a block key BK is recorded for each part 112 of the contents. Each block 113 of a part 112 may store a block seed BK—SEED and an initial vector INV. As with the memory card, the block key BK is represented as BK=DES (CK (+) PK, BK_SEED) (56 bits+8 bits).

Write Operation to Memory Card 40

An encrypting process which may be utilized in a recording (write) operation of recorder/player 1 will now be explained with reference to FIG. 9. For simplicity, in FIG. 9, similar portions to those in FIG. 1 are denoted by similar reference numerals and their description is omitted. In addition, interface 11, bus 16, and control block 41, through which data and commands are transferred between the components of recorder/player 1 and memory card 40, have been omitted from FIG. 9 and the following process explanation for simplicity. In FIG. 9, SeK is a session key shared between recorder/player 1 and memory card 40 after they have been mutually authenticated. In FIG. 9, reference numeral 10' is a CD and a source of a digital audio signal inputted at digital input 10.

When memory card 40 is attached to recorder/player 1, recorder/player 1 determines whether or not memory card 40 is a security type memory card by use of the identification information in the boot area thereof. Since memory card 40 is a security type memory card, recorder/player 1 and memory card 40 are mutually authenticated.

The process of mutual authentication between recorder/player 1 and memory card 40 will be hereinbelow described with reference to FIG. 10.

After a write request signal is sent from recorder/player 1 to memory card 40, recorder/player 1 and memory card 40 mutually authenticate again, as will be described in further detail with reference to FIG. 10. If recorder/player 1 and memory card 40 recognize each other as legitimate in accordance with the mutual identification process, a key writing process, as will be described in further detail with reference to FIG. 11, is performed. Otherwise, the write operation is terminated. After the key writing process is complete, audio data is encrypted and written to memory card 40 through interface 11 by CPU 2.

With reference to FIG. 9, recorder/player 1 generates a random number for each track of data (tune) to be written and creates a corresponding contents key CK according to each of the random numbers. Security block 3 of recorder/player 1 encrypts contents key CK using session key SeK. Recorder/player 1 outputs the encrypted contents key CK to memory card 40. DES encrypting/decrypting circuit 54 of security block 52 in memory card 40 decrypts the encrypted contents key CK, and re-encrypts the decrypted contents key CK using a storage key Kstm from memory 55. Memory card 40 outputs the re-encrypted CK to recorder/player 1 (CPU 2). Recorder/player 1 (CPU 2) sets the re-encrypted contents key CK in the key area 111 (as shown in FIG. 8B) of each track. Recorder/player 1 generates a random number for each part data area 112 (as shown in FIG. 8B) of each track, and creates a part key PK according to each random number. Each created part key PK is set in a corresponding part data area 112 by CPU 2.

A temporary key TMK may be generated by performing an XOR of part key PK and contents key CK by recorder/player 1 for each part data area 112 as shown below in equation (1). The creation of temporary key TMK is not limited to using an XOR function. It is possible to use other functional operators, such as a simple AND operator.

$$TMK=PK \text{ XOR } CK \tag{1}$$

Recorder/player 1 generates a random number for each block 113 of each part data area 112 and creates block seed BK_SEED according to each random number. Further, recorder/player 1 (CPU 2) sets the created block seed BK_SEED into its proper position in each corresponding block 113. Recorder/player 1 uses the temporary key TMK and the block seed BK_SEED in equation (2) to perform a Message Authentication Code ("MAC") operation to create block key BK for each block 113.

$$BK=MAC \text{ (TMK, BK\_SEED)} \tag{2}$$

It is possible to perform processing other than a MAC operation by using a secret key on the input of a SHA-1 (secure Hash algorithm), RIPEMD-160, or other one-way Hash functions to create block key BK. Here, the one-way function f defines a function from which it is easy to calculate y=f(x) from x, but conversely difficult to find x from y. A one-way Hash function is described in detail in the "Handbook of Applied Cryptography, CRC Press".

Audio encoder/decoder 7 compresses the digital audio signal inputted to digital input 10 from CD 10' or the digital signal from A/D converter 9, which converts an analog audio signal inputted to analog input 8 into a digital signal, in accordance with the ATRAC3 format. Then, security block 3 encrypts the compressed audio data in the Cipher Block Chaining ("CBC") mode by using the block key BK, the CBC mode being a data encryption mode prescribed in Federal Information Processing Standard ("FIPS") PUB 81 ("DES MODES OF OPERATION").

Recorder/player 1 adds headers to the encrypted audio data and outputs the results to memory card 40. Memory card 40 writes the encrypted audio data and headers into flash memory 42. At this point, writing of audio data from recorder/player 1 to memory card 40 is complete.

FIG. 10 shows an authenticating process performed between recorder/player 1 (SET) and memory card 40 (MEMORY CARD). At step S1, the random number generator of security block 52 in memory card 40 generates a random number Rm and sends the random number Rm and the serial number ID of memory card 40 to recorder/player 1.

At step S2, recorder/player 1 receives Rm and ID and generates an authentication key IKj according to the relationship IKj=MAC (MKj, ID), where MKj is one of the master keys stored in security block 3. Recorder/player 1 generates a random number Rd and creates a message authenticator $MAC_A$ (Message Authentication Code) with the authentication key, namely, MAC(IKj,Rd//Rm//ID). Thereafter, recorder/player 1 generates a random number Sd and sends Rd//Sd//$MAC_A$ //j to memory card 40.

At step S3, memory card 40 receives the data RD//Sd//$MAC_A$//j, finds an authentication key IKj from security block 52 corresponding to j, and calculates a $MAC_B$ with the authentication key IKj using Rd, Rm, and ID. When the calculated $MAC_B$ is equal to the received $MAC_A$, memory card 40 determines that recorder/player 1 is valid (i.e., authorized). At step S4, memory card 40 creates $MAC_C$= MAC(IKj,Rm//Rd) and generates a random number Sm. Thereafter, memory card 40 sends Sm//$MAC_C$ to recorder/player 1.

At step S5, recorder/player 1 receives Sm//$MAC_C$ from memory card 40. Recorder/player 1 calculates $MAC_D$ using IKj, Rm, and Rd. When the calculated $MAC_D$ is equal to the received $MAC_C$, recorder/player 1 determines that memory card 40 is valid (i.e., authorized). At step S6, recorder/player 1 designates MAC (IKj,Rm//Rd) as the session key SeK. At step S7, memory card 40 designates MAC (IKj,Rm//Rd) as the session key SeK. When recorder/player 1 and memory card 40 are mutually authenticated, the session key SeK is shared between them. The session key SeK is created whenever authentication is successful.

FIG. 11 shows a key writing process in the case that recorder/player 1 (SET) records audio data to flash memory 42 of memory card 40 (MEMORY CARD). At step S11, recorder/player 1 generates a random number for each track of contents and creates a contents key CK. At step S12, recorder/player 1 encrypts the contents key CK with the session key SeK and sends encrypted DES (SeK, CK) to memory card 40.

At step S13, memory card 40 receives the data DES (SeK, CK) from recorder/player 1 and decrypts the contents key CK with the session key SeK. The decrypting process is denoted by IDES (SeK, DES (SeK, CK)). At step S14, memory card 40 re-encrypts the decrypted contents key CK with the storage key Kstm from memory 55 and sends the re-encrypted contents key DES (Kstm, CK) to recorder/player 1.

At step S15, recorder/player 1 places the re-encrypted contents key CK in the key area 111 for managing the corresponding part data area 112 and performs a formatting process so that the re-encrypted contents key CK and the contents are recorded to flash memory 42 of memory card 40. To encrypt the contents, the contents key CK and the part key PK are exclusive-Ored (XOR, or alternatively, AND), as illustrated in FIG. 9 and equation 11 above. The result of the XOR operation is the temporary key TMK. The temporary key TMK is stored only in security block 3. Thus, the temporary key TMK is not accessible from outside of security block 3. At the beginning of each block 113, a random number is generated as a block seed BK_SEED. The random number is stored in each part data area 112. Recorder/player 1 encrypts the block seed BK_SEED with the temporary key TMK to obtain a block key BK. In other words, the relation of BK=(CK (+) PK, BK$_{13}$ SEED) is obtained. The block key BK is stored only in security block 3. Thus, the block key BK is not accessible from outside of security block 3.

At step S16, recorder/player 1 encrypts the data in each part data area 112 block by block with the block key BK and sends the encrypted data and the data in key area 111 to memory card 40. Memory card 40 records the encrypted data and the data in key area 111 (header data) received from recorder/player 1 to flash memory 42 at step S17.

Read Operation from Memory Card 40

A decrypting process for use in a reproducing (read) operation of recorder/player 1 will now be explained with reference to FIG. 12. For simplicity, in FIG. 12, similar portions to those in FIG. 1 are denoted by similar reference numerals and their description is omitted. In addition, interface 11, bus 16, and control block 41, through which data and commands are transferred between the components of recorder/player 1 and memory card 40, have been omitted from FIG. 12 and the following process explanation for simplicity.

A read request signal specifying a desired track of data (tune) is sent from recorder/player 1 to memory card 40. Recorder/player 1 and memory card 40 perform a mutual authentication operation, as above described with reference to FIG. 10. If recorder/player 1 and memory card 40 recognize each other as legitimate in accordance with the mutual identification process, a key writing process, as above described with reference to FIG. 11, is performed. Otherwise, the read operation is terminated. After the key writing process is complete, encrypted audio data is read from memory card 40 to recorder/player 1 by CPU 2.

Since mutual identification is carried out between memory card 40 and recorder/player 1, the encrypted contents key CK can be decrypted using the proper session key SeK only when memory card 40 and recorder/player 1 identify each other as legitimate. Therefore, illicit utilization of the audio data is easily avoided. Data read during the read operation had been written by the above-described write operation shown in FIG. 9. The setting of the contents key CK and the part key PK in each part data area 112, and the block seed BK_SEED in each block 113 is used for writing data to, and thus reading data from, the corresponding part data area 102. After step S6 of FIG. 10 is completed, memory card 40 and recorder/player 1 share session key SeK. The reading of audio data from memory card 40 proceeds as follows.

Memory card 40 specifies the data in the part data area 102 (FIG. 8A) corresponding to the read request signal and outputs the audio data in sound units SUs from the blocks 103 (FIG. 8A) in the specified part data area 102. Memory card 40 also reads the corresponding key area 101 (FIG. 8A) of the audio data and outputs it to recorder/player 1.

Recorder/player 1 picks-up the encrypted contents key CK from the data in the key area 101 and outputs it to memory card 40. DES encrypting/decrypting circuit 54 of security block 52 in memory card 40 decrypts the encrypted contents key CK using storage key Kstm stored in memory 55, and re-encrypts the decrypted contents key CK using session key SeK.

Memory card 40 outputs the re-encrypted contents key CK to recorder/player 1. Recorder/player 1 decrypts the re-encrypted contents key CK from memory card 40 using session key SeK. Recorder/player 1 then obtains the XOR of the decrypted contents key CK and the part key PK from data in each part data area 102 so as to obtain the temporary key TMK in accordance with equation (3).

$$TMK = PK \text{ XOR } CK \quad (3)$$

Recorder/player 1 uses the temporary key TMK and the block seed BK_SEED in each part data area 102 to perform the MAC operation shown in the following equation (4) so as to obtain the block key BK. The block key BK is found for every block 103 as follows.

$$BK = MAC (TMK, BK\_SEED) \quad (4)$$

Security block 3 of recorder/player 1 decrypts the audio data by using the block key BK. More specifically, the audio data is decrypted for every block 103 using the individually found block key BK. Further, decryption is carried out in the same 16 KB blocks 103 as used for encryption. Audio encoder/decoder 7 expands the decrypted audio data according to the ATRAC3 system and outputs the decoded signal through digital output 14 or D/A converter 12 converts the digital audio signal into an analog signal and outputs the result through analog output 13. Alternatively, the ATRAC3 audio data from security block 3 is outputted through output 15. Audio encoder/decoder 7 expands the audio data in sound units SUs.

FIG. 13 shows the decrypting process when recorder/player 1 reproduces an audio track stored in flash memory 42 of memory card 40. As with the write operation shown in FIGS. 9 to 11, the session key SeK is shared between recorder/player 1 and memory card 40 after they are mutually authenticated.

At step S21, recorder/player 1 (SET) reads data from memory card 40 (MEMORY CARD) and obtains the contents key CK encrypted with the storage key Kstm (namely, DES (Kstm, CK)) and encrypted contents (part data area(s) 102 of the desired track). Thereafter, recorder/player 1 sends the contents key CK encrypted with the storage key Kstm to memory card 40.

At step S22, memory card 40 decrypts the contents key CK with the storage key Kstm (namely, IDES (Kstm, DES (Kstm, CK)). At step S23, memory card 40 encrypts the decrypted contents key with the session key SeK and sends DES (SeK, CK) to recorder/player 1.

At step S24, recorder/player 1 decrypts the contents key with the session key SeK. At step S25, recorder/player 1 creates a block key BK with the decrypted contents key CK, a part key PK, and a block seed BK_SEED. At step S26, recorder/player 1 decrypts each encrypted part data area 102 with the block key BK block by block. The audio encoder/decoder 7 decodes the decrypted audio data.

With reference to interface 11 shown in FIG. 2, FIG. 14 shows a timing chart of data being read from memory card 40. In other than state 0 (initial state), a clock signal used to synchronize data is sent through clock line SCK. When data is sent or received between recorder/player 1 and memory card 40, the signal level of status line SBS is low. An initial condition may be referred to as state or status 0 (initial state). At timing t31, recorder/player 1 causes the signal level of status line SBS to become high (state 1).

When the signal level of status line SBS becomes high, memory card 40 (S/P and P/S IF block 43) determines that state 0 has changed to state 1. In state 1, recorder/player 1 sends a read command to memory card 40 through data line DIO. Thus, memory card 40 receives the read command. The read command is a protocol command referred to as a Transfer Protocol Command ("TPC"). As will be described later, the protocol command designates the contents of the communication and the length of data that follows.

At timing t32, after a command has been transmitted, the signal level of status line SBS changes from high to low. Thus, state 1 changes to state 2. In state 2, a process designated by a command received by memory card 40 is performed. In reality, data of an address designated by the read command is read from flash memory 42 to page buffer 45. While the process is being performed, a busy signal (high level) is sent to recorder/player 1 through data line DIO.

At timing t33, after data has been read from flash memory 42 to page buffer 45, the supplying of the busy signal is stopped. A ready signal (low level) that represents that memory card 40 is ready to send data in accordance with the read command is outputted to recorder/player 1.

When recorder/player 1 receives the ready signal from memory card 40, recorder/player 1 determines that memory card 40 is ready for processing the read command. At timing t34, recorder/player 1 causes the signal level of status line SBS to become high. In other words, state 2 changes to state 3.

In state 3, memory card 40 outputs data that has been read to page buffer 45 in state 2 to recorder/player 1 through data line DIO. At timing t35, after the read data has been sent, recorder/player 1 stops sending the clock signal through clock line SCK. In addition, recorder/player 1 causes the signal level of status line SBS to change from high to low. Thus, state 3 changes to the initial state (state 0).

When an interrupt process should be performed such as due to a state change in memory card 40 as at timing t36, memory card 40 sends an interrupt signal to recorder/player 1 through data line DIO. When recorder/player 1 receives the interrupt signal through data line DIO from memory card 40 in state 0, recorder/player 1 determines that the signal is an interrupt signal and performs a process corresponding to the interrupt signal.

FIG. 15 is a timing chart of an operation in which data is written to flash memory 42 of memory card 40. In the initial state (state 0), the clock signal is not sent through clock line SCK.

At timing t41, recorder/player 1 causes the signal level of status line SBS to change from low to high. Thus, state 0 changes to state 1. In state 1, memory card 40 is ready to receive a command. At timing t41, a write command is sent to memory card 40 through data line DIO and memory card 40 receives the write command.

At timing t42, recorder/player 1 causes the signal level of status line SBS to change from high to low. Thus, state 1 changes to state 2. In state 2, recorder/player 1 sends write data to memory card 40 through data line DIO and memory card 40 stores the received write data to page buffer 45.

At timing t43, recorder/player 1 causes the signal level of status line SBS to change from low to high. Thus, state 2 changes to state 3. In state 3, memory card 40 writes the write data to flash memory 42, memory card 40 sends a busy signal (high level) to recorder/player 1 through data line DIO, and recorder/player 1 sends a write command to memory card 40. Since the current state is state 3, recorder/player 1 determines that the signal received from memory card 40 is a status signal.

At timing t44, memory card 40 stops outputting the busy signal and sends a ready signal (low level) to recorder/player 1. When recorder/player 1 receives the ready signal, recorder/player 1 determines that the writing process corresponding to the write command has been completed and stops sending the clock signal. Additionally at timing t45, recorder/player 1 causes the signal level of status line SBS to change from high to low. Thus, state 3 returns to state 0 (initial state).

When recorder/player 1 receives a high level signal from memory card 40 through data line DIO in state 0, recorder/player 1 determines that the received signal is an interrupt signal. Recorder/player 1 performs a process corresponding to the received interrupt signal. When memory card 40 is to be detached from recorder/player 1, memory card 40 generates the interrupt signal.

In other than the reading process and the writing process, in state 1, a command is sent. In state 2, data corresponding to the command is sent.

It is noted that the serial interface disposed between recorder/player 1 and memory card 40 is not limited to interface 11 as described above. In other words, various types of serial interfaces may be used.

FIG. 16 is a table depicting examples of protocol commands (TPC codes) sent through the data line DIO of the serial interface. The data length of each protocol command is one byte. In FIG. 16, each protocol command is represented in hexadecimal notation (with suffix h) and decimal notation (0 and 1). In addition, definitions of individual protocol commands are represented for both the non-security type memory card 40' (see FIG. 3) and the security type memory card 40 (see FIG. 2). In FIG. 16, R and W represent a read type protocol command and a write type protocol command, respectively. As described above, since a command is sent in state 1 and data is sent in state 2, the data length (in bytes) corresponding to each protocol command is shown.

At this point, each of the protocol commands TPC will be described.

TPC=2Dh is an access command to a conventional flash memory (this command is simply referred to as memory control command). This command is a page data read command and is common to the memory cards 40 and 40'.

The length of data preceded by the command is the data length for one page (512 bytes+2 bytes (CRC)). The page data is read from the page buffer 45.

TPC=D2h is a memory control command. This command is a page data write command. The length of data preceded by the command is the data for one page (512 bytes+2 bytes (CRC)). The page data is written to the page buffer 45.

TPC=4Bh is a memory control command. This command is a read command against the read register 48. The data length of data preceded by the command is (31 bytes+2 bytes (CRC)).

TPC=B4h is a memory control command. This command is a write command against the write register 46. The data length of data preceded by the command is (31 bytes+2 bytes (CRC)).

TPC=78h is a memory control command. This command is a command for reading one byte from the read register 48. The data length of data preceded by the command is (1 byte+2 bytes (CRC)).

TPC=87h is a memory control command. This command is a command for varying the access range of the command register 44. The data length of data preceded by the command is (4 bytes+2 bytes (CRC)).

TPC=1Eh is a data read command for the status register of the security block 52 of the memory card 40. However, this command is not defined for the memory card 40'. The data length of data preceded by the command is (2 bytes+2 bytes (CRC)). A command dedicated for the security block 52 is referred to as security command.

TPC=E1h is a memory control command. This command is a command set command against the command register 44. This command is followed by a command in a lower hierarchical level than TPC commands. Thus, the data length of this command is (1 byte+2 bytes (CRC)).

TPC=3Ch is a security data read command against the security block 52 of the memory card 40. However, this command is not defined for the memory card 40'. The data length of data preceded by the command is (24 bytes+2 bytes (CRC)).

TPC=C3h is a security data write command against the security block 52 of the memory card 40. However, this command is not defined for the memory card 40'. The data length of data preceded by the command is (26 bytes+2 bytes (CRC)).

With reference now to FIGS. 17 and 18, a command (1 byte) followed by the TPC=E1h command will be described. FIG. 17 shows commands for the non-security type memory card 40'. These are as follows:
E1h=AAh: block read command
E1h=55h: block write command
E1h=33h: block read/write cancel command
E1h=99h: block erase command
E1h=CCh: memory operation stop command
E1h=5Ah: power save mode command
E1h=C3h: page buffer clear command
E1h=3Ch: memory controller reset command FIG. 18 shows commands for the security type memory card 40. Since the definitions of the commands (AAh to 3Ch) shown in FIG. 18 are the same as those shown in FIG. 17, they are omitted. In other words, these commands are memory control commands defined in common with the memory cards 40 and 40'. In FIG. 18, commands (60h to 83h) are security commands for an encrypting process (including a decrypting process and an authenticating process) dedicated for the memory card 40.

As shown in FIGS. 17 and 18, the memory control commands TPC in common with the memory cards 40 and 40' and security commands TPC dedicated for the memory card 40 are defined. Likewise, this relation applies to commands in lower hierarchical levels. In other words, in the lower hierarchical levels, common memory control commands and security commands are defined. The security commands are not defined (not used) for the memory card 40'. According to the illustrative embodiment, when the S/P and P/S IF block 43 receives a command from the recorder 1 through the serial interface, the memory card 40 determines whether or not the received command TPC is a common memory control command or a security command. The memory card 40 sends subsequent data to an appropriate circuit corresponding to the determined result. When the received command is for example the TPC=E1h command of which a command is followed by another command, the memory card 40 sends the command to a proper circuit corresponding to the definitions for the commands shown in FIG. 18.

FIG. 19 depicts an arrangement for selecting a circuit to which data is intended for, in correspondence with a received command. The arrangement is embodied within interface circuit 43 of memory card 40. Data is sent from recorder 1 to memory card 40 through data line DIO. The received data is supplied to a terminal "a" of a switch circuit 152 through a delay circuit 150. In addition, the received data is supplied to an input terminal of a detecting circuit 151. Detecting circuit 151 determines whether or not a protocol command (TPC) received through the data line DIO is a memory control command or a security command, according to the code value of the protocol command. Switch circuit 152 is controlled in accordance with the determined result. Delay circuit 150 compensates the detecting time of detecting circuit 151. These structural elements are accomplished by hardware and/or software in the S/P and P/S IF block 43. According to the embodiment, since codes that are not used for memory control commands are assigned to security commands, detecting circuit 151 can easily determine these two types of commands.

When the detecting circuit 151 has determined that the received protocol command is a memory control command, the terminal "a" of the switch circuit 151 is connected to a terminal "b". Thus, the memory control command is supplied to a page buffer (e.g., page buffer 45 shown in FIG. 2, but omitted in FIG. 19 for clarity), a register (e.g., register 46 or 48 shown in FIG. 2), and so forth through the terminals "a" and "b" of the switch circuit 151 so as to control the flash memory 42. Data following the memory control command is supplied to the page buffer, the register, and so forth. Alternatively, data is sent from the page buffer, the register, and so forth to the recorder 1 through the terminals "b" and "a" of the switch circuit 151.

When the detecting circuit 151 has determined that the received protocol command is a security command, the terminal "a" of the switch circuit 151 is connected to a terminal "c" thereof The security command is supplied to the security block 52 through the terminals "a" and "c" of the switch circuit 151. Data following the security command is supplied to the security block 52. The data is sent from security block 52 to recorder 1 through the terminals "a" and "c" of switch circuit 151.

When the received command is the protocol command (TPC=E1h), it is followed by a normal memory control command or a security command. When the detecting circuit 151 receives the TPC=E1h protocol command, the detecting circuit 151 determines whether the command is followed by a control command or a security command. Memory card 40 then controls the switch circuit 152 according to the determined result. When the received command is other than the command TPC=E1h and it is followed by a memory control command or a security command, the memory card 40 can send data to a proper circuit corresponding to the code value of the command.

Since memory card 40 has a function for determining whether the received command is a memory control command or a security command, memory card 40 can be used for a non-security type recorder. In other words, a non-security type recorder does not exchange security information with memory card 40. The non-security type recorder sends only write/read memory control commands and data corresponding thereto to memory card 40. As described above, memory card 40 determines whether or not a command received from a recorder is a memory control command and writes or reads data corresponding thereto to/from the flash memory 42. Thus, data can be written or read to/from the memory card 40.

With reference now to FIG. 20, the illustrative embodiment of the present invention will be further described. FIG. 20 shows the structure of the security block 52 of the memory card 40 in detail. The security block 52 is structured as a single chip IC along with the non-volatile memory 42, the S/P and P/S IF block 43, the page buffer 45, and so forth. As described above, the S/P and P/S I/F block 43 and the security block 52 are connected. The structure of the security block 3 of recorder 1 is the same as the structure of the security block 52 shown in FIG. 20.

In FIG. 20, reference numeral 110 is a DES encrypting circuit having a key storing memory (a non-volatile memory). In association with the encrypting circuit 110, a register group 111 is provided. The encrypting circuit 110 performs an encrypting process in, for example, CBC mode and controls switch circuits 112 and 113 so as to form a feedback loop. The contents of a write register 114 are supplied to the register group 111 through the switch circuit 112. The contents of the register group 111 are stored in a read register 115.

The read register 115 is connected to the register group 111 used in the encrypting circuit 110. The intermediate calculation result of the encrypting process is stored to the read register 115. Data written to the write register 114 is supplied from an S/P (Serial to Parallel) and P/S (Parallel to Serial) block 116. Data read from the read register 115 is supplied to the I/F block 43 through the S/P and P/S block 116. Write data is supplied from the recorder 1 through the above-described serial interface. Read data is supplied to the recorder 1 through the serial interface.

Security block 52 also includes a command register (CMD) 117 and a status register (STTS)118. A security command (60h to 83h) shown in FIG. 18 is sent from the recorder 1 to the memory card 40. The security command is stored to the command register 117 through the I/F block 43 and the S/P and P/S block 116. The command register 117 generates a command to be executed next. Commands stored in the command register 117 are those that allow non-secret contents to be read from the read register 115 to the exterior. These commands are for example commands 63h, 67h, and 6Dh shown in FIG. 18. With these commands, encrypted data created by the encrypting circuit 110 are sent from the register group 111 to the read register 115. With a command that allows non-secret data to be read, the read register 115 is read-enabled. In FIG. 20, the on/off states of the switch circuit 122 represent the read enable/disable states, respectively.

Status information stored in the status register 118 is sent to the recorder 1 through the S/P and P/S block 116 and the I/F block 43. The security block 52 also has a command register 119 which stores a command that is generated therein. In addition, the security block 52 has an increment block 120 that increments for example a command code. Thus, the security block 52 successively generates command codes. When the power of the memory card 40 is turned on (in the initial state), the command code of the internally generated command is 60h. Whenever the security block 52 executes one command, the increment block 120 increments the command code by "+1" (as 61h, 62h, 63h, . . . , 71h). When the memory card 40 is attached to the recorder 1, the command code is incremented from 60h to 71h so as to authenticate the memory card 40. The command codes 72h to 83h are used after the memory card 40 has been authenticated. The command codes 72h to 83h can be freely and repeatedly used, unlike the case with commands used in the authenticating process.

A comparing circuit 121 compares the values stored in the two command registers 117 and 119. The compared result of the comparing circuit 121 is stored in the status register 118. When the comparing circuit 121 has determined that a command received from the recorder 1 (namely, the contents of the command register 117) matches an internally generated command (namely, the contents of the command register 119), a non-error status is set to the status register 118. Data that represents the status is sent to the recorder 1. Thus, the operation of the recorder 1 continues. When the compared result of the comparing circuit 121 represents that these commands do not match, an error status is set to the status register 118. Data that represents the state is sent to the recorder 1. Thus, the recorder 1 stops the operation. In addition, a message that represents the status is displayed. In this case, when a reset operation is performed, the comparing circuit 121 is initialized.

According to the embodiment, authentication commands can be executed only in a predetermined sequence. Thus, even if the command 63h, 67h, 6Dh, or the like that causes the read register 115 to be enabled is supplied for illegally reading the intermediate calculation result of the encrypting process, since the compared result of the comparing circuit 121 represents a mismatch, the operation of the recorder 1 is stopped. Thus, the intermediate calculation result of the encrypting process can be prevented from being illegally read.

Although the above-described security functions according to the present invention were described in connection with the security unit 52 of memory unit 40, it should be noted that the present invention can also be applied to the security block 3 of the recorder 1. In other words, certain features of security block 52, and in particular, the capability of preventing an intermediate calculation result to be read therefrom, can be incorporated into the security block 3 of the recorder. In addition, while DES was described as a preferred encrypting method, it is contemplated that various other encrypting methods can alternatively be used.

From the foregoing, it should be appreciated that embodiments of the present invention exhibit certain advantages over the prior art. For instance, in the security unit that performs an encrypting process, since one register performs the function of storing the intermediate calculation result of the encrypting process and the additional function of storing the encrypted data, it is not necessary to use two registers. In addition, since it is not necessary to use a plurality of encrypting circuits, the circuit scale of the security unit can be reduced. Moreover, the register is read-enabled only when non-secret data is stored to the register using a command code, thus enabling that data to be externally accessed. In other words, a secret intermediate calculation result can be prevented from being externally accessed. Thus, the security of secret data is improved. Even if a command is received which allows the contents stored in the register to be read, the intermediate calculation result is prohibited from being accessed.

It is also to be understood that the following claims are intended to cover all of the generic and specific features of the invention herein described and all statements of the scope of the invention which, as a matter of language, might be said to fall therebetween.

What is claimed is:

1. A security unit comprising:
   encrypting means for encrypting data in accordance with a predetermined sequence of externally generated commands received by said security unit;
   storing means for storing both intermediate and final results of the encryption; and
   switching means operatively coupled to said storing means for selectively outputting the contents of said storing means;
   wherein said switching means is controlled to prevent external access to said intermediate results of said encryption process stored in said storing means.

2. The security unit of claim 1, further comprising second storing means for storing an externally generated command received by the security unit;
   wherein said switching means is controlled to prevent access to said final result of said encryption in accordance with the command stored in said second storing means.

3. The security unit of claim 1, further comprising detection means for detecting whether or not said commands are received in said predetermined sequence.

4. The security unit of claim 1, further comprising:
   command generating means for generating commands in said predetermined sequence; and
   comparing means for comparing the externally generated commands with the commands generated by said command generating means;
   wherein if said commands so compared are not coincident, said security unit outputs an error signal.

5. A memory unit comprising a non-volatile memory and a security unit for encrypting data in accordance with commands received in a predetermined sequence from the exterior of the security unit, said encrypted data being stored in said non-volatile memory, wherein said security unit comprises:
   storing means for storing both intermediate and final results of the encryption; and
   switching means operatively coupled to said storing means for selectively outputting the contents of said storing means;
   wherein said switching means is controlled to prevent external access to said intermediate results of said encryption process stored in said storing means.

6. The memory unit of claim 5, wherein said security unit further comprises second storing means for storing an externally generated command received by the security unit;
   wherein said switching means is controlled to prevent access to said final result of said encryption in accordance with the command stored in said second storing means.

7. The memory unit of claim 5, wherein said security unit further comprises detection means for detecting whether or not said commands are received in said predetermined sequence.

8. The memory unit of claim 5, wherein said security unit further comprises:
   command generating means for generating commands in said predetermined sequence; and
   comparing means for comparing the commands received by the security unit with the commands generated by said command generating means;
   wherein if the commands so compared are not coincident, said security unit outputs an error signal.

9. The memory unit of claim 5, further comprising an interface means connected to said non-volatile memory and said security unit, for receiving external data supplied to said memory unit and for selectively supplying said external data to said non-volatile memory or said security unit.

10. The memory unit of claim 9, wherein said interface means receives an external command supplied to said memory unit and supplies data to said non-volatile memory or to said security unit in accordance with said external command.

11. A method for encrypting data in accordance with commands received in a predetermined sequence, comprising:
    storing intermediate and final results of said encryption in a storing means; and
    preventing access to said intermediate results of said encryption stored in said storing means.

12. The method of claim 11, further comprising preventing the outputting of said final result of said encryption in response to a received command.

13. The method of claim 11, further comprising detecting whether or not said commands are received in said predetermined sequence.

14. The method of claim 11, further comprising:
    generating commands in said predetermined sequence;
    comparing the commands received in a predetermined sequence with said generated commands; and
    outputting an error signal if the commands so compared are not coincident.

15. The method of claim 11 wherein said storage means is a single register.

16. A security unit comprising:
    an encrypting unit for encrypting data in accordance with commands received by said security unit;
    a common register for storing both intermediate results and final results of the data encryption; and
    a switching element operatively coupled to said register for selectively outputting the contents of said register;
    wherein said switching element is controlled to prevent external access to said intermediate results of the encryption.

17. A memory unit comprising a non-volatile memory and a security unit for encrypting data in accordance with received commands, said encrypted data being stored in said non-volatile memory, wherein said security unit comprises:
    a common register for storing both intermediate results and final results of the data encryption; and
    a switching element operatively coupled to said register for selectively outputting the contents of said register;
    wherein said switching element is controlled to prevent external access to said intermediate results of the encryption.

18. A data processing unit including a security unit, said security unit comprising:
    an encrypting unit for encrypting data in accordance with commands received by said security unit;
    a common register for storing both intermediate results and final results of the data encryption; and
    a switching element operatively coupled to said register for selectively outputting the contents of said register;
    wherein said switching element is controlled to prevent external access to said intermediate results of the encryption.

* * * * *